(12) United States Patent
Mori et al.

(10) Patent No.: US 11,237,494 B2
(45) Date of Patent: Feb. 1, 2022

(54) ELECTROPHOTOGRAPHIC PHOTOSENSITIVE MEMBER, PROCESS CARTRIDGE AND ELECTROPHOTOGRAPHIC IMAGE FORMING APPARATUS

(71) Applicant: c/o CANON KABUSHIKI KAISHA, Tokyo (JP)

(72) Inventors: Haruki Mori, Chiba (JP); Shubun Kujirai, Ibaraki (JP); Koichi Nakata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/082,610

(22) Filed: Oct. 28, 2020

(65) Prior Publication Data
US 2021/0124280 A1 Apr. 29, 2021

(30) Foreign Application Priority Data
Oct. 29, 2019 (JP) .............................. JP2019-196774

(51) Int. Cl.
| | |
|---|---|
| G03G 5/147 | (2006.01) |
| G03G 5/07 | (2006.01) |
| G03G 21/18 | (2006.01) |
| C09D 133/14 | (2006.01) |
| C08F 220/36 | (2006.01) |

(52) U.S. Cl.
CPC ......... *G03G 5/0732* (2020.05); *C08F 220/36* (2013.01); *C09D 133/14* (2013.01); *G03G 21/1814* (2013.01)

(58) Field of Classification Search
CPC ...... G03G 5/071; G03G 5/072; G03G 5/0763; G03G 5/0764
See application file for complete search history.

(56) References Cited

U.S. PATENT DOCUMENTS

| | | |
|---|---|---|
| 7,186,489 B2 | 3/2007 | Uematsu et al. |
| 7,226,711 B2 | 6/2007 | Amamiya et al. |
| 7,534,534 B2 | 5/2009 | Nakata et al. |
| 9,316,931 B2 | 4/2016 | Takagi et al. |
| 9,389,523 B2 | 7/2016 | Nakata et al. |
| 9,594,318 B2 | 3/2017 | Nakata et al. |
| 9,740,117 B2 | 8/2017 | Kosaka et al. |
| 10,042,272 B2 | 8/2018 | Mori et al. |

(Continued)

FOREIGN PATENT DOCUMENTS

| | | | |
|---|---|---|---|
| JP | 2000-206724 | * 7/2000 | ............. G03G 5/147 |
| JP | 2005062300 A | 3/2005 | |

(Continued)

OTHER PUBLICATIONS

Translation of JP 2019-012141.*
Translation of JP 2000-206724.*

*Primary Examiner* — Peter L Vajda
(74) *Attorney, Agent, or Firm* — Venable LLP

(57) ABSTRACT

There is provided an electrophotographic photosensitive member capable of suppressing the environmental fluctuation in repeated use. A protective layer of the electrophotographic photosensitive member contains a polymer of a composition containing a hole transporting compound having two or more (meth)acryloyloxy groups and a compound having a specific structure.

10 Claims, 2 Drawing Sheets

(56) References Cited

U.S. PATENT DOCUMENTS

| | | |
|---|---|---|
| 10,120,331 B2 | 11/2018 | Nakata et al. |
| 10,310,395 B2 | 6/2019 | Nakata et al. |
| 10,365,569 B2 | 7/2019 | Tokimitsu et al. |
| 10,451,984 B2 | 10/2019 | Mori et al. |
| 10,488,769 B2 | 11/2019 | Nakata et al. |
| 10,488,771 B2 | 11/2019 | Mori et al. |
| 10,558,132 B2 | 2/2020 | Ishiduka et al. |
| 10,558,133 B2 | 2/2020 | Nakamura et al. |
| 10,670,979 B2 | 6/2020 | Nakata et al. |
| 10,761,442 B2 | 9/2020 | Nakata et al. |
| 10,768,539 B2 | 9/2020 | Mori et al. |
| 2019/0369514 A1 | 12/2019 | Watanabe et al. |
| 2020/0159136 A1 | 5/2020 | Mori et al. |
| 2020/0201200 A1 | 6/2020 | Tokimitsu et al. |
| 2020/0218171 A1 | 7/2020 | Takeuchi et al. |
| 2020/0249590 A1 | 8/2020 | Nakata et al. |
| 2020/0341391 A1 | 10/2020 | Tokimitsu et al. |
| 2020/0341394 A1 | 10/2020 | Ikari et al. |
| 2020/0393772 A1 | 12/2020 | Takeuchi et al. |
| 2020/0393775 A1 | 12/2020 | Kujirai et al. |
| 2021/0033991 A1 | 2/2021 | Mitsui et al. |
| 2021/0033992 A1 | 2/2021 | Kaku et al. |

FOREIGN PATENT DOCUMENTS

| | | | |
|---|---|---|---|
| JP | 2005062302 A | 3/2005 | |
| JP | 2007011005 A | 1/2007 | |
| JP | 2010152180 A | 7/2010 | |
| JP | 2018194794 A | 12/2018 | |
| JP | 2019-012141 | * 1/2019 | ............ G03G 5/147 |

\* cited by examiner

ELECTROPHOTOGRAPHIC PHOTOSENSITIVE MEMBER, PROCESS CARTRIDGE AND ELECTROPHOTOGRAPHIC IMAGE FORMING APPARATUS

BACKGROUND OF THE INVENTION

Field of the Invention

The present invention relates to an electrophotographic photosensitive member, a process cartridge having an electrophotographic photosensitive member, and an electrophotographic image forming apparatus.

Description of the Related Art

Electrophotographic photosensitive members mounted on electrophotographic image forming apparatuses (hereinafter, also referred to as "electrophotographic apparatuses") include organic electrophotographic photosensitive members (hereinafter, referred to as "electrophotographic photosensitive members") containing an organic photoconductive substance (charge generating substance), which have been broadly studied so far.

In recent years, along with the speed-up of the printing speed of electrophotographic apparatuses, the life extension of electrophotographic photosensitive members has been demanded, and many attempts to suppress the reduction of the film thickness of the electrophotographic photosensitive members in repeated use have been made.

In Japanese Patent Application Laid-Open No. 2005-62300 and Japanese Patent Application Laid-Open No. 2005-62302, electrophotographic photosensitive members containing, in the surface layer, a charge transporting compound having a chain polymerizing functional group and a compound having one or more hydroxy groups in the molecule are described, wherein excellent mechanical durability (wear resistance) and electrophotographic characteristic are developed.

SUMMARY OF THE INVENTION

According to studies by the present inventors, the electrophotographic photosensitive members according to Japanese Patent Application Laid-Open No. 2005-62300 and Japanese Patent Application Laid-Open No. 2005-62302 have large differences in potential fluctuation in the use environment. Specifically, for example, the difference is remarkable between the potential fluctuation in repeated use in a high-temperature high-humidity environment and the potential fluctuation in repeated use in a low-temperature low-humidity environment. Here, in the present specification, such an environmental dependency of the potential fluctuation in repeated use of an electrophotographic photosensitive member is also referred to as "environmental fluctuation". When the environmental fluctuation of an electrophotographic photosensitive member is large, since the variation width of the image density when a large number of sheets of electrophotographic images are formed differs depending on the environment when the electrophotographic images are formed, when the images are formed, the variation width of the image density needs to be regulated according to the use environment. Hence, an electrophotographic photosensitive member having a small environmental fluctuation is demanded.

Therefore, an object of the present invention is to provide an electrophotographic photosensitive member capable of suppressing the difference (environmental fluctuation) in the potential fluctuation in repeated use among use environments.

Further another object of the present invention is to provide a process cartridge and an electrophotographic apparatus capable of suppressing the difference (environmental fluctuation) in the potential fluctuation in repeated use among use environments.

The above object is achieved by the following present invention.

That is, in the electrophotographic photosensitive member according to the present invention having a conductive supporting member, a photosensitive layer, and a protective layer in this order, the protective layer contains a polymer of a composition containing a hole transporting compound having two or more (meth)acryloyloxy groups and a compound represented by the following formula (1):

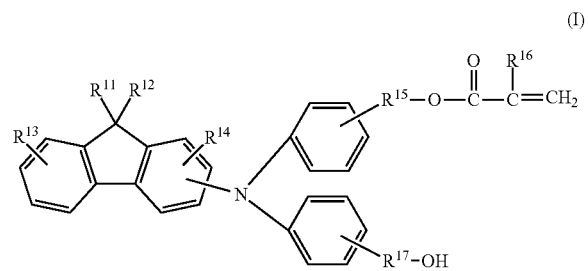

wherein $R^{11}$ and $R^{12}$ each independently represent an alkyl group having 1 or more and 8 or less carbon atoms; $R^{13}$ and $R^{14}$ each independently represent a hydrogen atom or an alkyl group having 4 or less carbon atoms; $R^{15}$ and $R^{17}$ each independently represent an alkylene group having 2 or more and 6 or less carbon atoms; and $R^{16}$ represents a hydrogen atom or a methyl group.

The process cartridge according to the present invention integrally supports the above electrophotographic photosensitive member and at least one unit selected from the group consisting of a charging unit, a developing unit and a cleaning unit, and is detachably attachable to the main body of an electrophotographic image forming apparatus.

The electrophotographic image forming apparatus according to the present invention has the above electrophotographic photosensitive member and at least one unit selected from the group consisting of a charging unit, an exposure unit, a developing unit and a transfer unit.

According to the present invention, there can be provided an electrophotographic photosensitive member capable of suppressing the difference (environmental fluctuation) in the potential fluctuation in repeated use among use environments. Further according to the present invention, there can be provided a process cartridge and an electrophotographic apparatus having the electrophotographic photosensitive member capable of exhibiting advantageous effects thereof.

Further features of the present invention will become apparent from the following description of exemplary embodiments with reference to the attached drawings.

DESCRIPTION OF THE EMBODIMENTS

Figure 1:
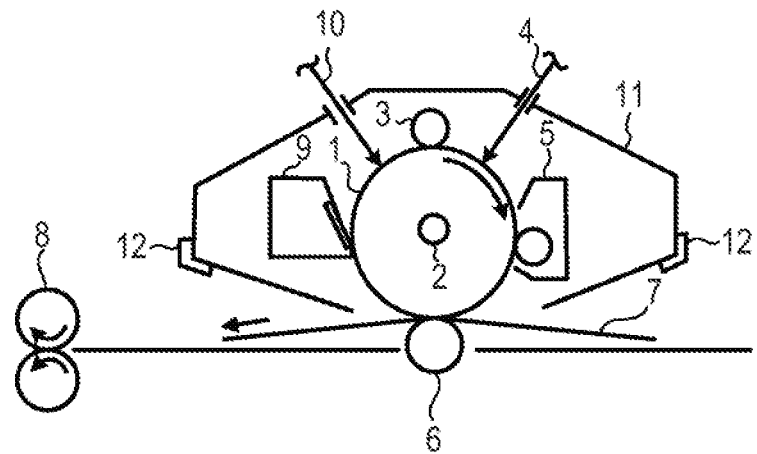
FIG. 1 is a schematic constitution view of an electrophotographic image forming apparatus.

Preferred embodiments of the present invention will now be described in detail in accordance with the accompanying drawings.

In an electrophotographic photosensitive member according to one aspect of the present invention, a protective layer contains a polymer of a composition containing a hole transporting compound having two or more (meth)acryloyloxy groups and a compound represented by the following formula (1):

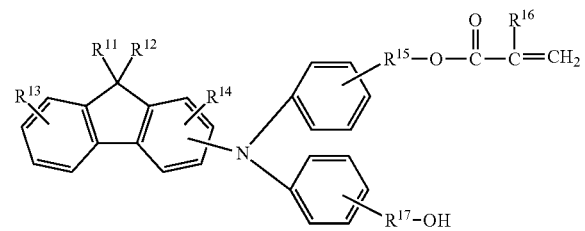

(I)

wherein $R^{11}$ and $R^{12}$ each independently represent an alkyl group having 1 or more and 8 or less carbon atoms; $R^{13}$ and $R^{14}$ each independently represent a hydrogen atom or an alkyl group having 4 or less carbon atoms; $R^{15}$ and $R^{17}$ each independently represent an alkylene group having 2 or more and 6 or less carbon atoms; and $R^{16}$ represents a hydrogen atom or a methyl group.

The present inventors presume the reason that the above characteristic leads to the development of advantageous effects of the present invention, as follows.

The difference (environmental fluctuation) in the potential fluctuation in repeated use of the electrophotographic photosensitive member among the use environment is caused by that the potential fluctuation becomes larger in a high-temperature high-humidity environment having a high absolute water content than in a low-temperature low-humidity environment. It is presumed that the influence of water having penetrated through the protective layer on a charge generating substance in the photosensitive layer differs depending on the use environment, making the difference remarkable. It is presumed that in particular, since the absolute water content in the use environment largely differs between in a high-temperature high-humidity environment and in a low-temperature low-humidity environment, a difference in an influence of water on the charge generating substance arises, and the repeated use augments the influence and enlarges the environmental fluctuation.

The electrophotographic photosensitive members described in Japanese Patent Application Laid-Open No. 2005-62300 and Japanese Patent Application Laid-Open No. 2005-62302 contain a compound having one or more hydroxy groups in the molecule. It is conceivable that since the hydroxy group is a hydrophilic group, in a high-temperature high-humidity environment having a high absolute water content, water easily permeates in the protective layer and easily reaches a charge generating substance in the protective layer. It is presumed that for the above reason, in the electrophotographic photosensitive members described in Japanese Patent Application Laid-Open No. 2005-62300 and Japanese Patent Application Laid-Open No. 2005-62302, the potential fluctuation in repeated use particularly in a high-temperature high-humidity environment worsens, making the environmental fluctuation remarkable.

In the electrophotographic photosensitive member according to the present invention, the protective layer contains a polymer of a composition containing a hole transporting compound having two or more (meth)acryloyloxy groups and a compound represented by the following formula (1):

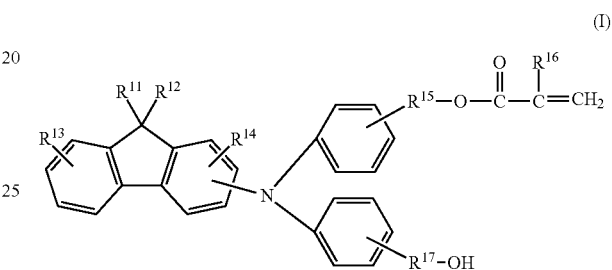

(I)

wherein $R^{11}$ and $R^{12}$ each independently represent an alkyl group having 1 or more and 8 or less carbon atoms; $R^{13}$ and $R^{14}$ each independently represent a hydrogen atom or an alkyl group having 4 or less carbon atoms; $R^{15}$ and $R^{17}$ each independently represent an alkylene group having 2 or more and 6 or less carbon atoms; and $R^{16}$ represents a hydrogen atom or a methyl group.

The compound represented by the formula (1) has a fluorene structure having a large molecular volume, wherein alkyl groups having hydrophobicity are bound to the 9-position of the fluorene structure. It is presumed that this characteristic structure enables the compound represented by the formula (1) to develop high hydrophobicity. It is presumed that hence, in spite of having a hydroxy group in the molecule, the permeation of water into the protective layer becomes low, and the potential fluctuation and the environmental fluctuation in repeated use in a high-temperature high-humidity environment can be suppressed.

Further in the present invention, the compound of the formula (1) needs to be used, as a composition forming the polymer, concurrently with a hole transporting compound having two or more (meth)acryloyloxy group. It is presumed that the compound of the formula (1) also has a (meth) acryloyl group, and the commonness of the functional group of the compounds constituting the polymer secures better affinity, well exhibiting the operation and effect of the present invention.

Hereinafter, specific examples of the compound represented by the formula (1) are cited (exemplary compounds 1-1 to 1-23), but the present invention is not any more limited thereto.

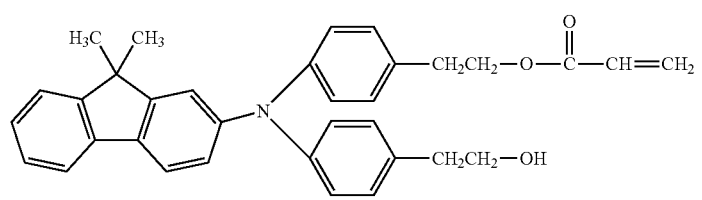
1-1
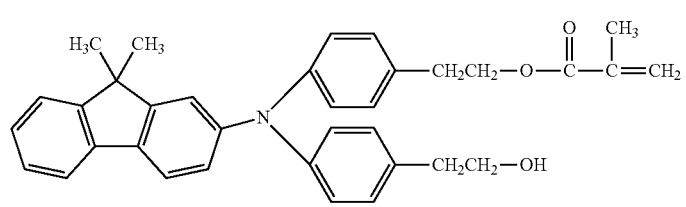
1-2
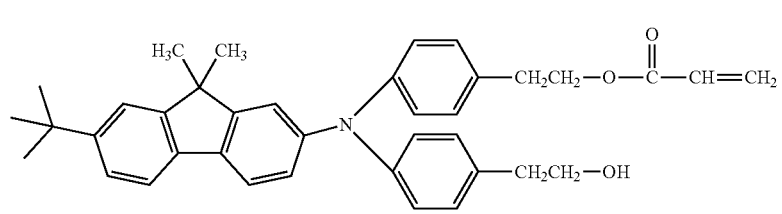
1-3
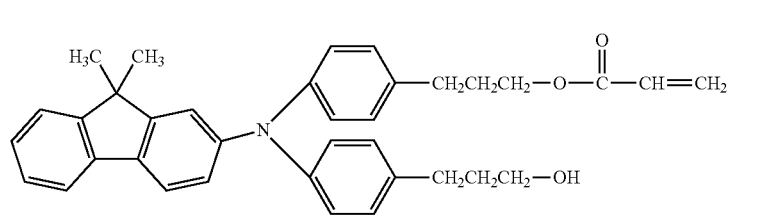
1-4
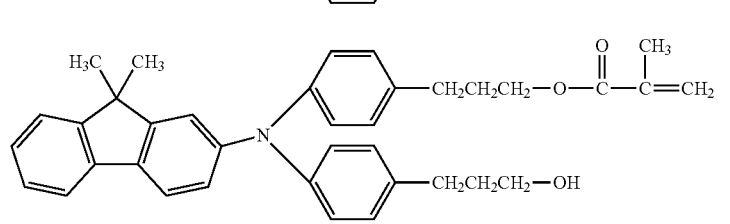
1-5
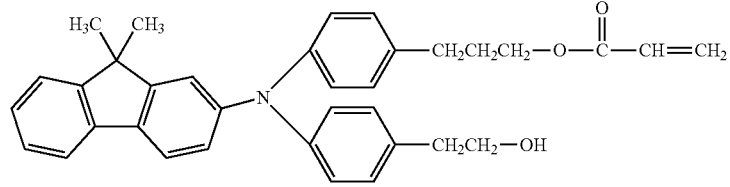
1-6
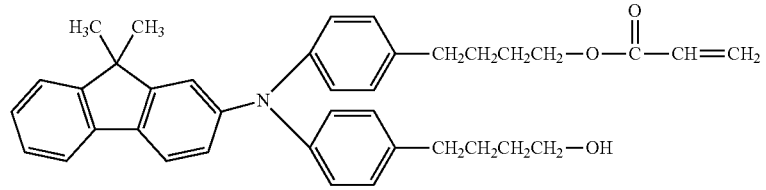
1-7
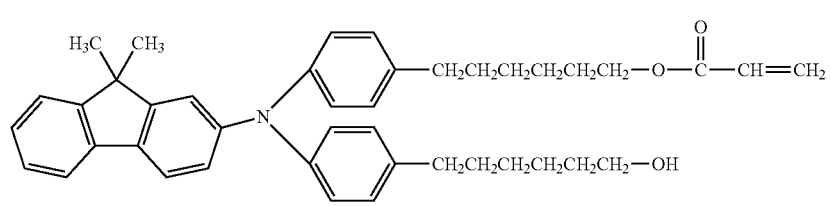
1-8

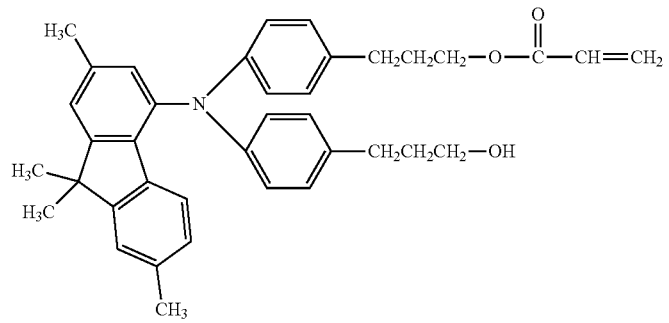
1-9
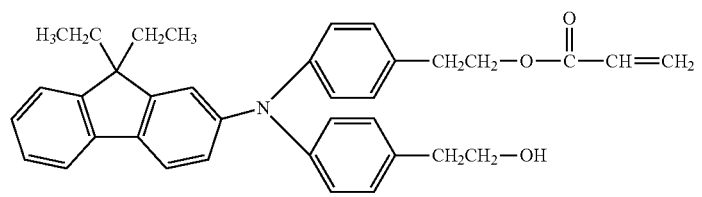
1-10
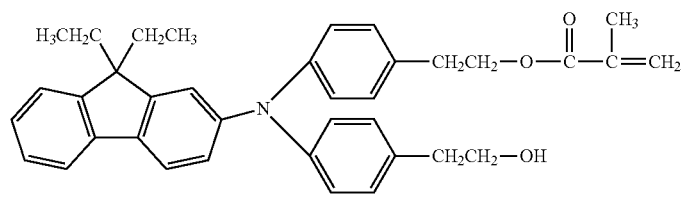
1-11
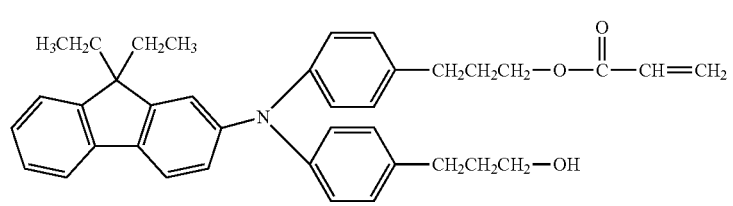
1-12
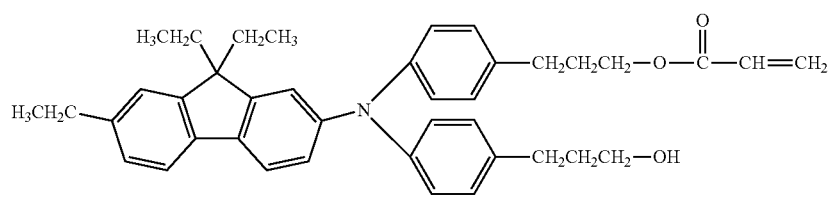
1-13
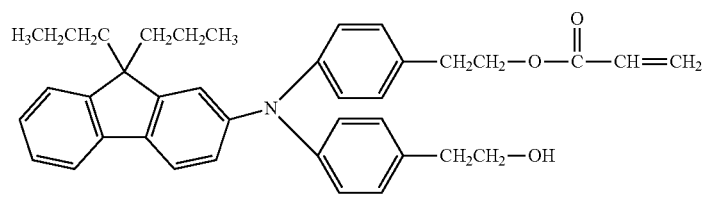
1-14
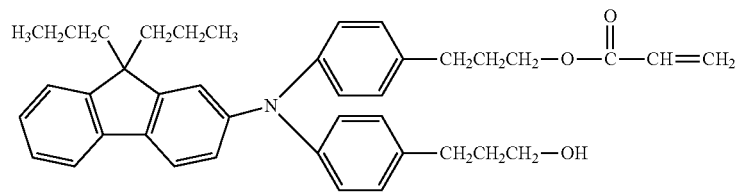
1-15

-continued
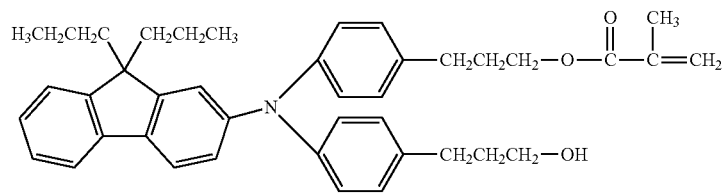
1-16
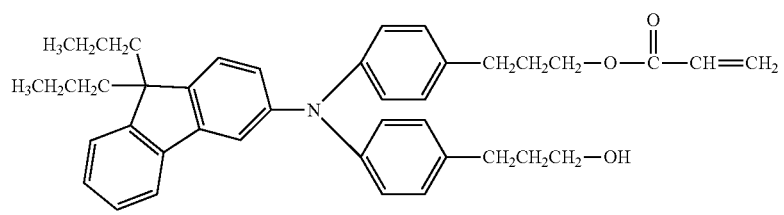
1-17
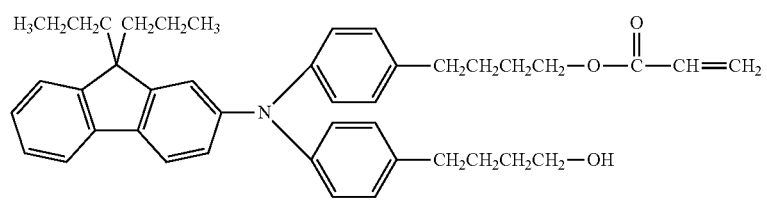
1-18
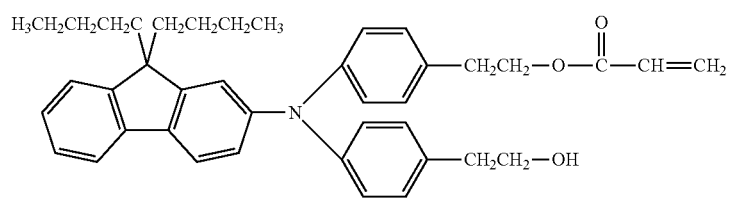
1-19
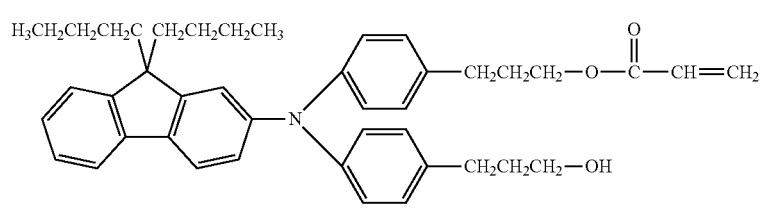
1-20
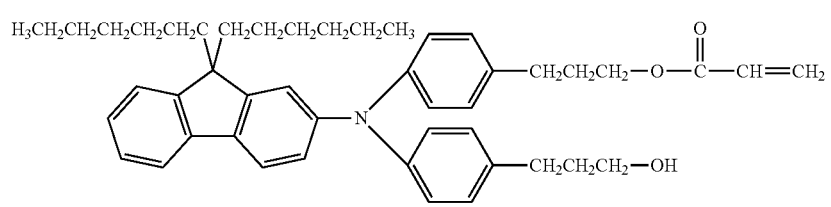
1-21

-continued

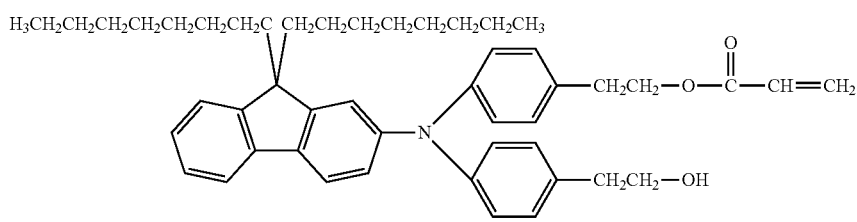

1-22

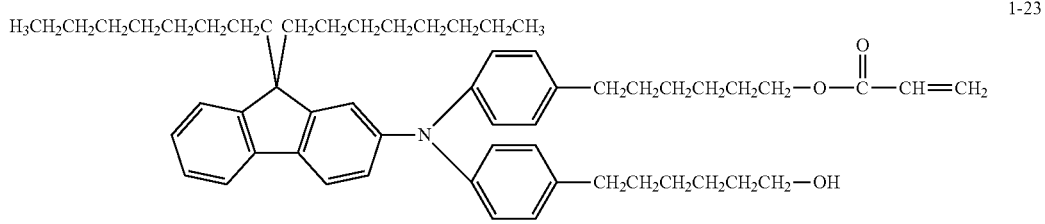

1-23

The hole transporting compound having two or more (meth)acryloyloxy groups is preferably a compound represented by the following formula (4):

(4)

wherein A represents an a-valent hole transporting group which may have an alkyl group; a represents an integer of 2 to 4; and $P^1$ represents a monovalent functional group represented by the following formula (5), and $P^1$ may be identical or different.

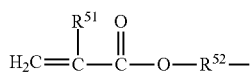

(5)

wherein $R^{51}$ represents a hydrogen atom or a methyl group; and $R^{52}$ represents an alkylene group.

The hole transporting group means a functional group having an amine structure (triarylamine structure) having three aryl groups. The aryl group includes aromatic hydrocarbon groups such as a phenyl group, a biphenyl group, a fluorenyl group and a naphthyl group.

More preferably, the hole transporting compound having two or more (meth)acryloyloxy groups is a compound represented by the following formula (2):

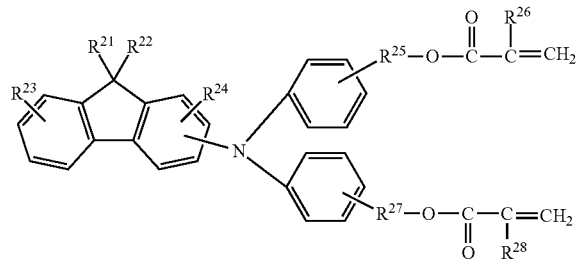

(2)

wherein $R^{21}$ and $R^{22}$ each independently represent an alkyl group having 2 or more and 8 or less carbon atoms; $R^{23}$ and $R^{24}$ each independently represent a hydrogen atom or an alkyl group having 4 or less carbon atoms; $R^{25}$ and $R^{27}$ each independently represent an alkylene group having 3 or more and 6 or less carbon atoms; and $R^{26}$ and $R^{28}$ each independently represent a hydrogen atom or a methyl group.

It is presumed that the compound represented by the formula (2) has a fluorene structure having alkyl groups on the 9-position thereof, and the high hydrophobicity can thereby be developed. It is presumed that hence, the potential fluctuation and the environmental fluctuation in repeated use in a high-temperature high-humidity environment can be suppressed.

Hereinafter, specific examples of the hole transporting compound having two or more (meth)acryloyloxy groups are cited (exemplary compounds 2-1 to 2-9), but the present invention is not any more limited thereto.

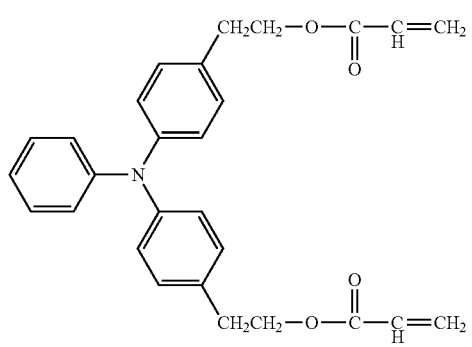

2-1

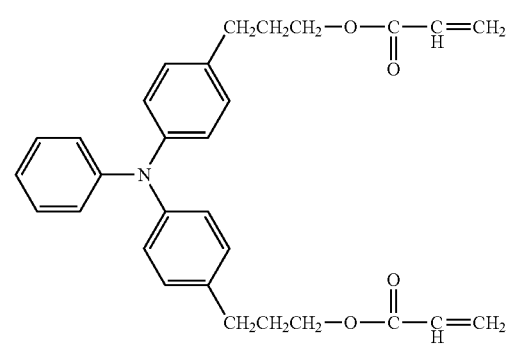

2-2

-continued
2-3
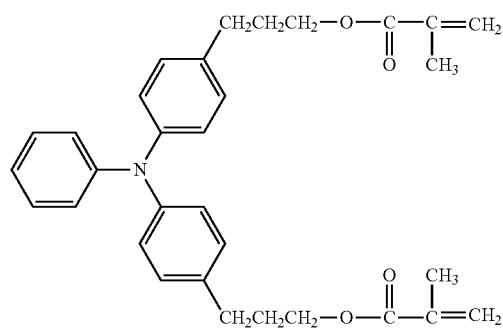
2-4
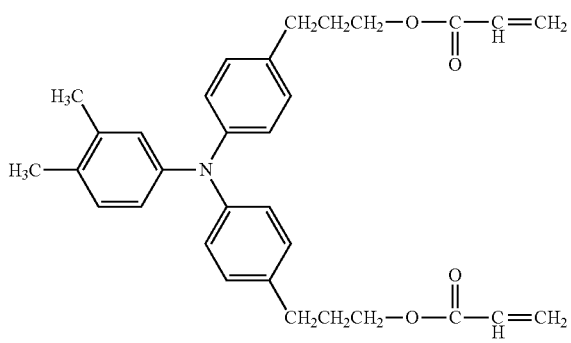
2-5
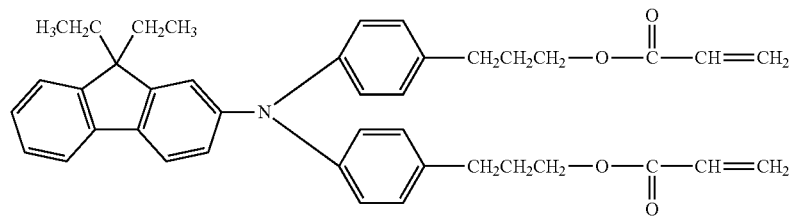
2-6
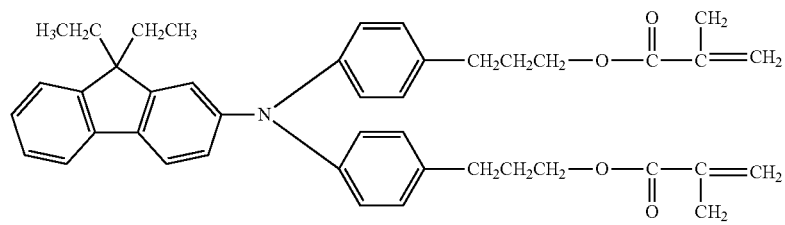
2-7
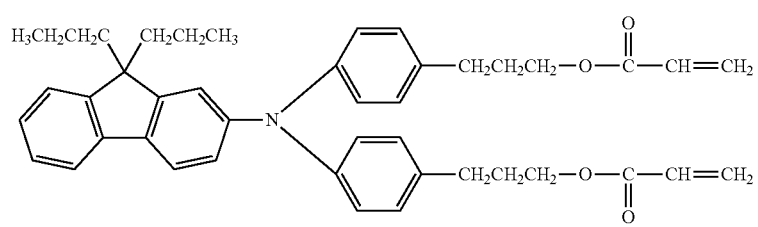
2-8
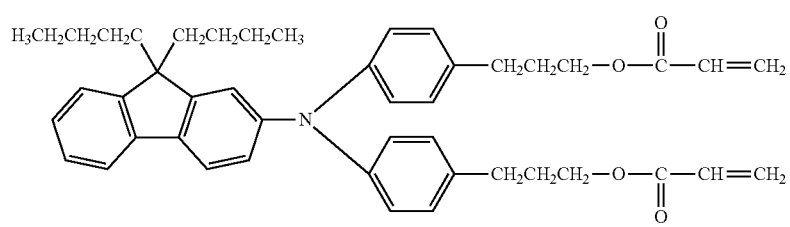
2-9
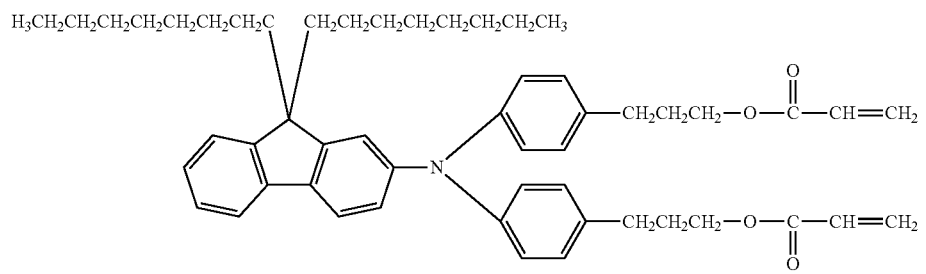
The content of the compound represented by the formula (1) in the composition forming the polymer the protective layer contains is, based on the total mass of the composition, designed to be 3.0% by mass or lower. Preferably, the content is, based on the total mass of the composition, 1.0% by mass or lower. By setting the content in this range, excellent wear resistance can be attained. More preferably, the content is 0.5% by mass or higher and 1.0% by mass or lower. By setting the content in this range, excellent wear resistance and an excellent effect of suppressing the environmental fluctuation can be attained.

The composition preferably contains a compound represented by the following formula (3):

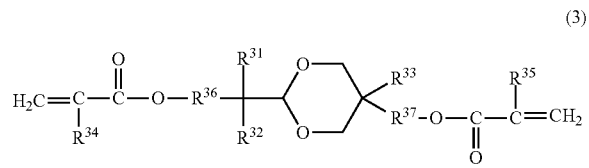

(3)

wherein $R^{31}$ and $R^{32}$ each independently represent an alkyl group having 1 or more and 4 or less carbon atoms, an aryl group having a substituent, or an unsubstituted aryl group; the substituent of the aryl group having a substituent is an alkyl group having 4 or less carbon atoms; $R^{31}$ and $R^{32}$ may be bound to each other to form a ring; $R^{33}$ represents an alkyl group having 1 or more and 4 or less carbon atoms; $R^{34}$ and $R^{35}$ each independently represent a hydrogen atom or a methyl group; and $R^{36}$ and $R^{37}$ each independently represent an alkylene group having 1 or more and 4 or less carbon atoms.

It is presumed that the compound represented by the formula (3), since having a suitable molecular weight and molecular size, improves the denseness of the protective layer containing the compound and has the effect of suppressing the permeation and the like of water in the protective layer. It is presumed that hence, the potential fluctuation and the environmental fluctuation in repeated use in a high-temperature high-humidity environment can be suppressed. It is further conceivable that since the denseness of the protective layer is improved, the wear resistance of the electrophotographic photosensitive member is improved.

At least one of $R^{31}$ and $R^{32}$ in the compound represented by the formula (3) is preferably an alkyl group having 2 or more carbon atoms. It is presumed that in this case, since the hydrophobicity of the compound represented by the formula (3) is improved, the potential fluctuation and the environmental fluctuation in repeated use in a high-temperature high-humidity environment can be suppressed.

Hereinafter, specific examples of the compound represented by the formula (3) are cited (exemplary compounds 3-1 to 3-18), but the present invention is not any more limited thereto.

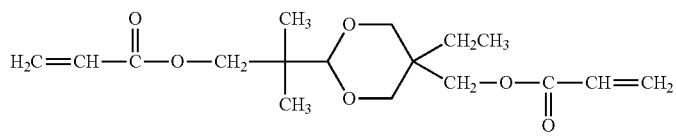

3-1

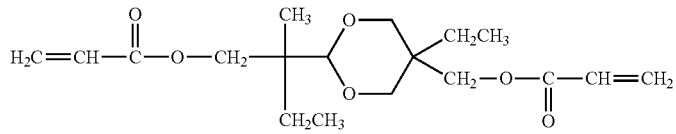

3-2

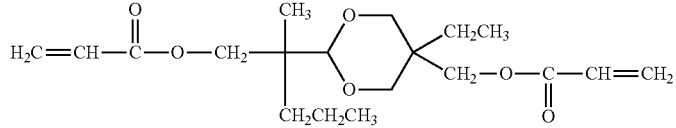

3-3

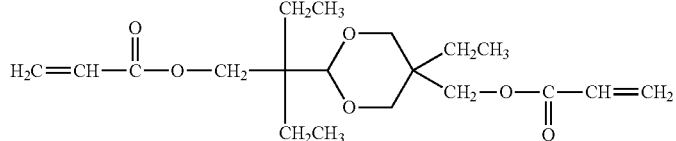

3-4

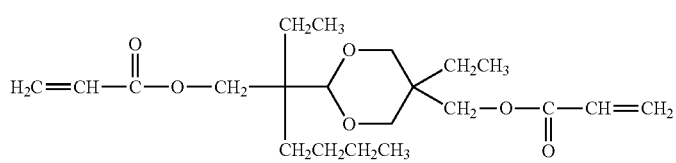

3-5

-continued
3-6
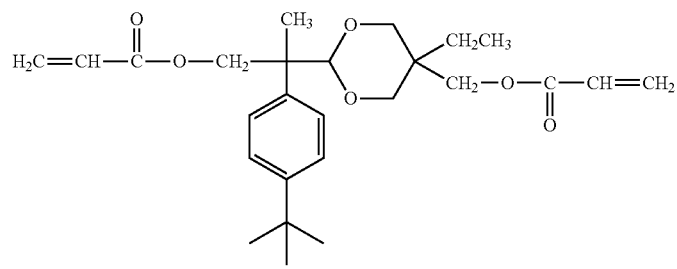
3-7
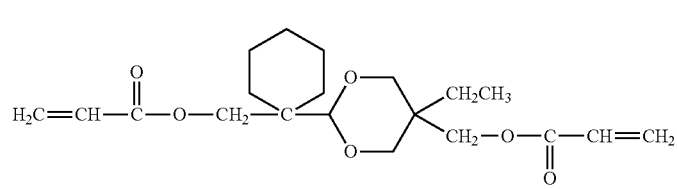
3-8
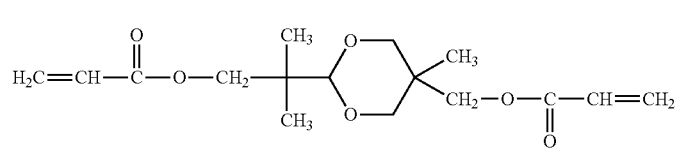
3-9
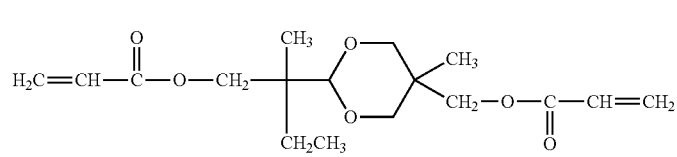
3-10
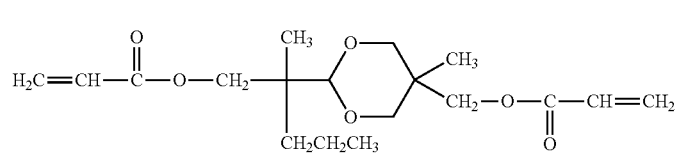
3-11
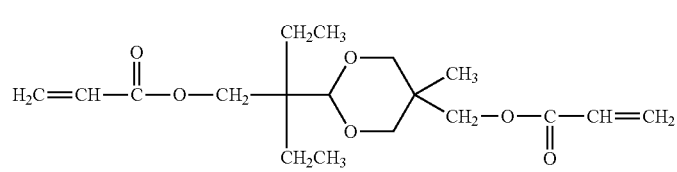
3-12
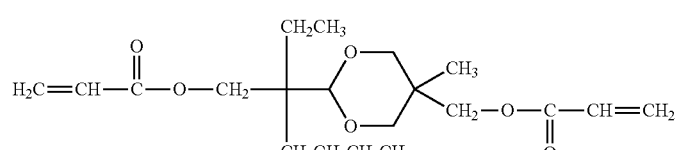
3-13
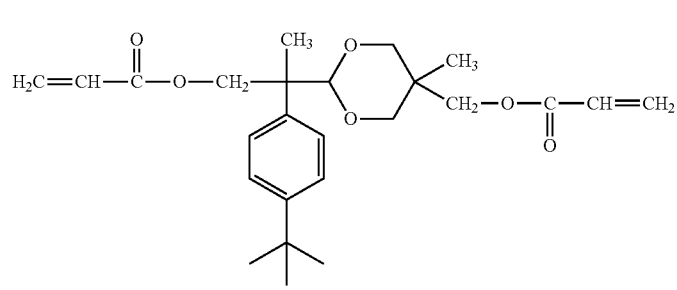

-continued 3-14
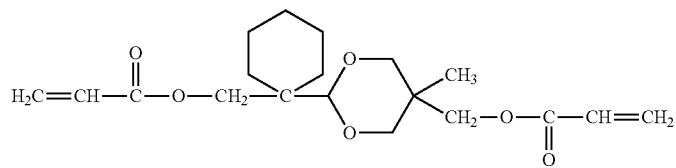

3-15
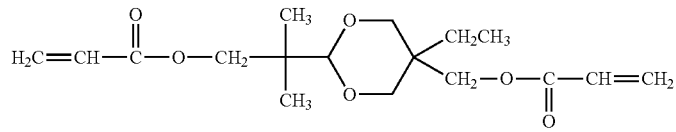

3-16
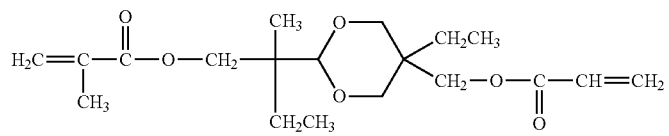

3-17
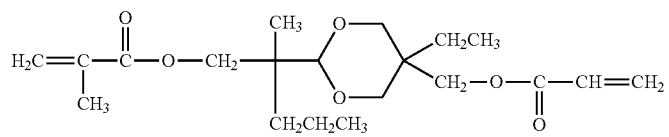

3-18
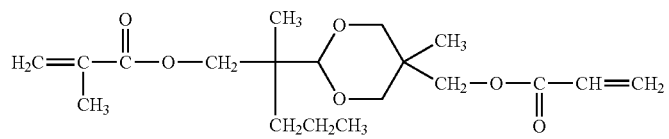

The content of the compound represented by the formula (3) in the composition forming the polymer the protective layer contains is, based on the total mass of the composition, preferably 5.0% by mass or higher and 50.0% by mass or lower, and more preferably 10.0% by mass or higher and 30.0% by mass or lower. By setting the content in this range, both the potential fluctuation in repeated use in a low-temperature low-humidity environment and the potential fluctuation in repeated use in a high-temperature high-humidity environment can simultaneously be suppressed.

The composition preferably contains any of compounds represented by the following formulas (4) to (6):

$$R^{41}\text{---}(Z)_a \quad (4)$$

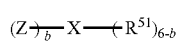

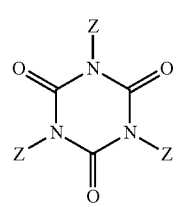

In the formulas (4) to (6), Z represents a monovalent group represented by the following formula (7):

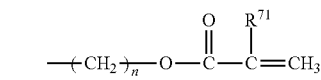

wherein n represents an integer of 0 to 6; and $R^{71}$ represents a hydrogen atom or a methyl group.

In the formula (4), a represents an integer of 3 to 6; and $R^{41}$ represents an a-valent group formed by removing a hydrogen atom from an alkane.

In the formula (5), b represents an integer of 3 to 6; $R^{51}$ represents a hydroxy group or an alkyl group; and X represents a hexavalent group represented by the following formula (8):

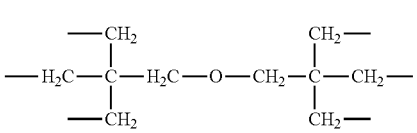

It is presumed that the compounds represented by the formulas (4) to (6), since having three or more (meth) acryloyloxy groups, improve the crosslinking density of the protective layer containing the compounds and have the effect of suppressing permeation and the like of water into the protective layer. It is presumed that hence, the potential fluctuation and the environmental fluctuation in repeated use in a high-temperature high-humidity environment can be suppressed. It is further conceivable that since the denseness of the protective layer is improved, the wear resistance of the electrophotographic photosensitive member is improved.

Hereinafter, specific examples of the compounds represented by the formulas (4) to (6) are cited (exemplary compounds 4-1 and 4-2, 5-1 to 5-3, 6-1 and 6-2), but the present invention is not any more limited thereto.

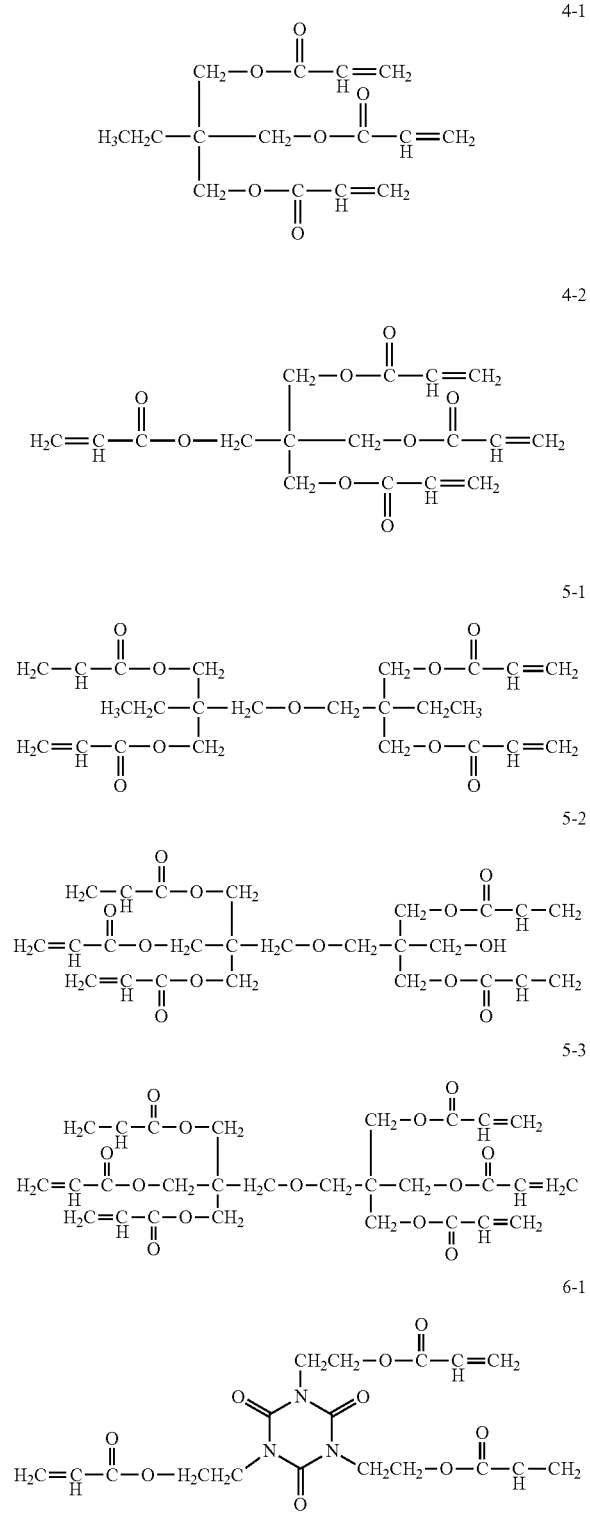

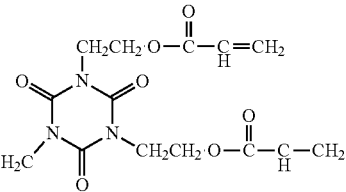

The content of the compounds represented by the formulas (4) to (6) in the composition forming the polymer the protective layer contains is, based on the total mass of the composition, preferably 5.0% by mass or higher and 50.0% by mass or lower, and more preferably 10.0% by mass or higher and 30.0% by mass or lower. By setting the content in this range, both the potential fluctuation in repeated use in a low-temperature low-humidity environment and the potential fluctuation in repeated use in a high-temperature high-humidity environment can simultaneously be suppressed.

Here, a composition is a compound(s) forming the polymer. The above formula (1), (2) or (3) corresponds to a composition. Then, the total mass of a composition refers to, for example, a total mass of a compound represented by the formula (1), a compound represented by the formula (2) and a compound represented by the formula (3).

Then, the protective layer of the electrophotographic photosensitive member according to the present invention may contain additives such as an antioxidant, an ultraviolet absorber, a plasticizer, a leveling agent, a slipperiness imparting agent and a wear resistance improver. The additives specifically include hindered phenol compounds, hindered amine compounds, sulfur compounds, phosphorus compounds, benzophenone compounds, silicone oils, fluororesin particles, polystyrene resin particles, polyethylene resin particles, silica particles, alumina particles and boron nitride particles.

When the protective layer contains additives, it is preferable that the content proportion of the additives in a composition of the protective layer be 50% by mass or lower.

The average film thickness of the protective layer is preferably 0.5 μm or larger and 10 μm or smaller, and more preferably 1 μm or larger and 7 μm or smaller.

A method for producing an electrophotographic photosensitive member according to one aspect of the present invention relates to an electrophotographic photosensitive member having a conductive supporting member, a photosensitive layer and a protective layer in this order. The production method has a step (i) of forming a coated film of a coating liquid for a protective layer which is a composition containing a hole transporting compound having two or more (meth)acryloyloxy groups and a compound represented by the formula (1). The production method further has a step (ii) of forming a protective layer by a polymerization reaction of the composition containing the hole transporting compound having two or more (meth)acryloyloxy groups and the compound represented by the formula (1) in the coated film.

The method for producing an electrophotographic photosensitive member is preferably one in which the content of the compound represented by the formula (1) is, based on the total mass of the composition, 1.0% by mass or lower.

The method for producing an electrophotographic photosensitive member is preferably one in which the hole transporting compound having two or more (meth)acryloyloxy groups is a compound represented by the formula (2).

The method for producing an electrophotographic photosensitive member is preferably one in which the composition contains a compound represented by the formula (3).

The method for producing an electrophotographic photosensitive member is preferably one in which the content of the compound represented by the formula (3) is, based on the total mass of the composition, 5.0% by mass or higher and 50.0% by mass or lower.

The method for producing an electrophotographic photosensitive member is preferably one in which the composition contains compounds represented by the formulas (4) to (6).

The method for producing an electrophotographic photosensitive member is preferably one in which the content of the compounds represented by the formulas (4) to (6) is, based on the total mass of the composition, 5.0% by mass or higher and 50.0% by mass or lower.

The method for producing an electrophotographic photosensitive member is preferably one in which at least one of $R^{31}$ and $R^{32}$ of the compound represented by the formula (3) is an alkyl group having 2 or more carbon atoms.

As a solvent to be used for preparation of the coating liquid for a protective layer, it is preferable to use a solvent which does not dissolve a layer installed underneath the protective layer. More preferably, the solvent is an alcoholic solvent such as methanol, ethanol, propanol, isopropanol, 1-butanol, 2-butanol, 1-methoxy-2-propanol or cyclopentanol.

A method of applying the coating liquid for a protective layer includes dip coating, spray coating, inkjet coating, roll coating, die coating, blade coating, curtain coating, wire bar coating and ring coating. Among these, from the viewpoint of efficiency and productivity, dip coating is preferable.

A method of curing a coated film of the coating liquid for a protective layer includes curing methods using heat, ultraviolet rays or electron beams. In order to retain the strength of the protective layer and the durability of the electrophotographic photosensitive member, a curing method using ultraviolet rays or electron beams is preferable.

When the coated film is polymerized by using electron beams, since a very dense (high density) cured material (three-dimensionally crosslinked structure) is obtained and the protective layer having higher durability is obtained, the case is preferable. Examples of an accelerator in the case of irradiation with electron beams include scanning-type, electrocurtain-type, broad beam-type, pulse-type and laminar-type ones.

In the case of using electron beams, the acceleration voltage of the electron beams is, from the viewpoint of being capable of suppressing deterioration of material characteristics by the electron beams without impairing the polymerization efficiency, preferably 120 kV or lower. Then the electron beam absorbed dose by the coated film surface of the coating liquid for a protective layer is preferably 1 kGy or higher and 50 kGy or lower, and more preferably 5 kGy or higher and 10 kGy or lower.

In the case of curing (polymerizing) the coated film by using electron beams, for the purpose of suppressing the polymerization inhibitory action by oxygen, it is preferable that the coated film be irradiated with electron beams in an inert gas atmosphere, and thereafter heated in an inert gas atmosphere. Examples of the inert gas include nitrogen, argon and helium.

It is preferable that after the irradiation with ultraviolet rays or electron beams, the electrophotographic photosensitive member be heated at 100° C. or higher and 170° C. or lower. By doing so, the surface layer which has higher durability and suppresses image defects is obtained.

Then, the constitution of the electrophotographic photosensitive member according to the present invention will be described. Each constituent of the electrophotographic photosensitive member will be described, and also a production method thereof will be described.

[Electrophotographic Photosensitive Member]

An electrophotographic photosensitive member according to one aspect of the present invention has a conductive supporting member, a photosensitive layer and a protective layer in this order.

Figure 2:
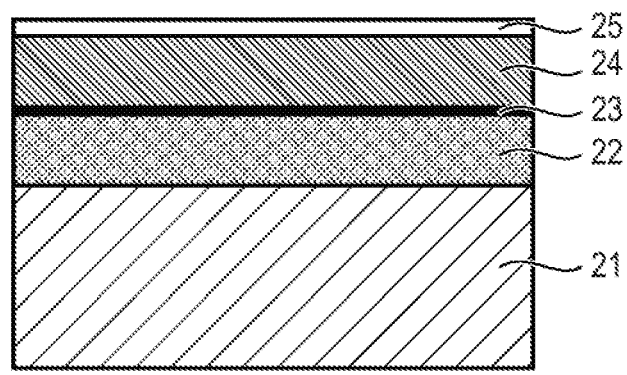
FIG. 2 is a layer structure view of an electrophotographic photosensitive member.

FIG. 2 is a view illustrating an example of a layer structure of an electrophotographic photosensitive member. In FIG. 2, the electrophotographic photosensitive member has a conductive supporting member 21, an undercoat layer 22, a charge generation layer 23, a charge transport layer 24, and a protective layer 25. In this case, the charge generation layer 23 and the charge transport layer 24 constitute a photosensitive layer.

A method for producing the electrophotographic photosensitive member includes a method of preparing a coating liquid for each layer described later, and applying and drying the each coating liquid in the order of corresponding layers. As an application method at this time, the above-mentioned methods cited as methods of applying a coating liquid for a surface layer can be used.

Hereinafter, the supporting member and the each layer will be described.

<Conductive Supporting Member>

The electrophotographic photosensitive member according to the present invention has a conductive supporting member. The shape of the supporting member includes cylindrical, belt-like and sheet-like ones. Among these, a cylindrical supporting member is preferable. Then, the surface of the supporting member may be subjected to an electrochemical treatment such as anodic oxidation, a blast treatment, a machining treatment or the like.

The material of the supporting member is preferably a metal, a resin, a glass or the like.

The metal includes aluminum, iron, nickel, copper, gold, stainless steel and alloys thereof. Among these, an aluminum supporting member is preferable.

Then, it is preferable that to the resin and the glass, conductivity be imparted by a treatment such as mixing or coating with a conductive material.

<Conductive Layer>

In the present invention, a conductive layer may be provided on the supporting member. By providing the conductive layer, flaws and irregularities on the supporting member surface can be concealed and the reflection of light from the supporting member surface can be controlled.

The conductive layer preferably contains a conductive particle and a resin.

The material of the conductive particle includes metal oxides, metals and carbon black.

The metal oxides include zinc oxide, aluminum oxide, indium oxide, silicon oxide, zirconium oxide, tin oxide, titanium oxide, magnesium oxide, antimony oxide and bismuth oxide. The metals include aluminum, nickel, iron, nichrome, copper, zinc and silver.

Among these, as the conductive particle, it is preferable to use metal oxides and it is more preferable to use, in particular, titanium oxide, tin oxide and zinc oxide.

In the case of using a metal oxide as the conductive particle, the surface of the metal oxide may be treated with a silane coupling agent, or the metal oxide may be doped with an element such as phosphorus or aluminum or an oxide thereof.

Further the conductive particle may have a laminated structure having a core particle and a coating layer coating the particle. The core particle includes titanium oxide, barium sulfate and zinc oxide. The coating layer includes metal oxides such as tin oxide.

Further in the case of using a metal oxide as the conductive particle, the volume-average particle diameter thereof is preferably 1 nm or larger and 500 nm or smaller, and more preferably 3 nm or larger and 400 nm or smaller.

The resin includes polyester resins, polycarbonate resins, polyvinyl acetal resins, acrylic resins, silicone resins, epoxy resins, melamine resins, polyurethane resins, phenol resins and alkyd resins.

The conductive layer may further contain a silicone oil, a resin particle, a masking agent such as titanium oxide, and the like.

The average film thickness of the conductive layer is preferably 1 µm or larger and 50 µm or smaller, and especially preferably 3 µm or larger and 40 µm or smaller.

The conductive layer is formed by preparing a coating liquid for a conductive layer containing the above each material and a solvent, and forming and drying a coated film thereof on the supporting member. The solvent to be used for the coating liquid includes alcoholic solvents, sulfoxide-based solvents, ketone-based solvents, ether-based solvents, ester-based solvents and aromatic hydrocarbon-based solvents. A method of dispersing the conductive particle in the coating liquid for a conductive layer includes methods using a paint shaker, a sand mill, a ball mill or a liquid collision-type high-speed dispersing machine.

<Undercoat Layer>

In the present invention, on the supporting member or the conductive layer, an undercoat layer may be provided. By providing the undercoat layer, the interlayer adhesive function is enhanced and the charge injection blocking function can be imparted.

The undercoat layer preferably contains a resin. The undercoat layer may be formed as a cured film made by polymerizing a composition containing a monomer having a polymerizable functional group.

The resin includes polyester resins, polycarbonate resins, polyvinyl acetal resins, acrylic resins, epoxy resins, melamine resins, polyurethane resins, phenol resins, polyvinyl phenol resins, alkyd resins, polyvinyl alcohol resins, polyethylene oxide resins, polypropylene oxide resins, polyamide resins, polyamic resins, polyimide resins, polyamideimide resins and cellulose resins.

The polymerizable functional group the monomer having the polymerizable functional group has includes an isocyanate group, a blocked isocyanate group, a methylol group, alkylated methylol groups, an epoxy group, metal alkoxide groups, a hydroxyl group, an amino group, a carboxyl group, a thiol group, carboxylic anhydride groups and carbon-carbon double bond groups.

The undercoat layer, for the purpose of enhancing electric characteristics, may further contain an electron transporting substance, a metal oxide, a metal, a conductive polymer and the like. Among these, it is preferable to use an electron transporting substance and a metal oxide.

The electron transporting substance includes quinone compounds, imide compounds, benzimidazole compounds, cyclopentadienylidene compounds, fluorenone compounds, xanthone compounds, benzophenone compounds, cyanovinyl compounds, aryl halide compounds, silole compounds and boron-containing compounds. By using an electron transporting substance having a polymerizable functional group as the electron transporting substance and copolymerizing the electron transporting substance with the above monomer having a polymerizable functional group, the undercoat layer may be formed as a cured film.

The metal oxide includes indium tin oxide, tin oxide, indium oxide, titanium oxide, zinc oxide, aluminum oxide and silicon dioxide. The metal includes gold, silver and aluminum.

The undercoat layer may further contain additives.

The average film thickness of the undercoat layer is preferably 0.1 µm or larger and 50 µm or smaller, more preferably 0.2 µm or larger and 40 µm or smaller, and especially preferably 0.3 µm or larger and 30 µm or smaller.

The undercoat layer is formed by preparing a coating liquid for an undercoat layer containing the above each material and a solvent, and forming and drying and/or curing a coated film thereof, for example, on the conductive supporting member. The solvent to be used for the coating liquid includes alcoholic solvents, ketone-based solvents, ether-based solvents, ester-based solvents and aromatic hydrocarbon-based solvents.

<Photosensitive Layer>

The photosensitive layer of the electrophotographic photosensitive member is classified mainly into (1) a multilayer-type photosensitive layer and (2) a single layer-type photosensitive layer. (1) The multilayer-type photosensitive layer has a charge generation layer containing a charge generating substance and a charge transport layer containing a charge transporting substance. (2) The single layer-type photosensitive layer is a photosensitive layer containing together a charge generating substance and a charge transporting substance.

(1) The Multilayer-Type Photosensitive Layer

The multilayer-type photosensitive layer has a charge generation layer and a charge transport layer.

(1-1) The Charge Generation Layer

It is preferable that the charge generation layer contain a charge generating substance and a resin.

The charge generating substance includes azo pigments, perylene pigments, polycyclic quinone pigments, indigo pigments and phthalocyanine pigments. Among these, azo pigments and phthalocyanine pigments are preferable. Among the phthalocyanine pigments, an oxytitanium phthalocyanine pigment, a chlorogallium phthalocyanine pigment and a hydroxygallium phthalocyanine pigment are preferable.

The content of the charge generating substance in the charge generation layer is, based on the total mass of the charge generation layer, preferably 40% by mass or higher and 85% by mass or lower, and more preferably 60% by mass or higher and 80% by mass or lower.

The resin includes polyester resins, polycarbonate resins, polyvinyl acetal resins, polyvinyl butyral resins, acrylic resins, silicone resins, epoxy resins, melamine resins, polyurethane resins, phenol resins, polyvinyl alcohol resins, cellulose resins, polystyrene resins, polyvinyl acetate resins and polyvinyl chloride resins. Among these, polyvinyl butyral resins are preferable.

The charge generation layer may further contain additives such as antioxidants and ultraviolet absorbers. The additives specifically include hindered phenol compounds, hindered amine compounds, sulfur compounds, phosphorus compounds and benzophenone compounds.

The average film thickness of the charge generation layer is preferably 0.1 μm or larger and 1 μm or smaller, and more preferably 0.15 μm or larger and 0.4 μm or smaller.

The charge generation layer is formed by preparing a coating liquid for a charge generation layer containing the above each material and a solvent, and forming and drying a coated film thereof, for example, on the conductive layer. The solvent to be used for the coating liquid includes alcoholic solvents, sulfoxide-based solvents, ketone-based solvents, ether-based solvents, ester-based solvents and aromatic hydrocarbon-based solvents.

(1-2) The Charge Transport Layer

The charge transport layer preferably contains a charge transporting substance and a resin.

Examples of the charge transporting substance include polycyclic aromatic compounds, heterocyclic compounds, hydrazone compounds, styryl compounds, enamine compounds, benzidine compounds and triarylamine compounds, and resins having a group derived from these substances. Among these, triarylamine compounds and benzidine compounds are preferable.

The content of the charge transporting substance in the charge transport layer is, based on the total mass of the charge transport layer, preferably 25% by mass or higher and 70% by mass or lower, and more preferably 30% by mass or higher and 55% by mass or lower.

The resin includes polyester resins, polycarbonate resins, acrylic resins and polystyrene resins. Among these, polycarbonate resins and polyester resins are preferable. As the polyester resins, in particular, polyarylate resins are preferable.

The content ratio (mass ratio) of the charge transporting substance and the resin is preferably 4:10 to 20:10, and more preferably 5:10 to 12:10.

The charge transport layer may further contain additives such as an antioxidant, an ultraviolet absorber, a plasticizer, a leveling agent, a slipperiness imparting agent and a wear resistance improver. The additives specifically include hindered phenol compounds, hindered amine compounds, sulfur compounds, phosphorus compounds, benzophenone compounds, siloxane-modified resins, silicone oils, fluororesin particles, polystyrene resin particles, polyethylene resin particles, silica particles, alumina particles and boron nitride particles.

The average film thickness of the charge transport layer is preferably 5 μm or larger and 50 μm or smaller, more preferably 8 μm or larger and 40 μm or smaller, and especially preferably 10 μm or larger and 30 μm or smaller.

The charge transport layer is formed by preparing a coating liquid for a charge transport layer containing the above each material and a solvent, and forming and drying a coated film thereof, for example, on the charge generation layer. The solvent to be used for the coating liquid includes alcoholic solvents, ketone-based solvents, ether-based solvents, ester-based solvents and aromatic hydrocarbon-based solvents. Among these solvents, ether-based solvents and aromatic hydrocarbon-based solvents are preferable.

(2) The Single Layer-Type Photosensitive Layer

The single layer-type photosensitive layer can be formed by preparing a coating liquid for a photosensitive layer containing a charge generating substance, a charge transporting substance, a resin and a solvent, and forming and drying a coated film thereof. The charge generating substance, the charge transporting substance and the resin are the same as in exemplification of materials in the above "(1) The multilayer-type photosensitive layer".

The average film thickness of the single layer-type photosensitive layer is preferably 5 μm or larger and 50 μm or smaller, more preferably 8 μm or larger and 40 μm or smaller, and especially preferably 10 μm or larger and 30 μm or smaller.

<Protective Layer>

The protective layer is formed, as described above, through a step of preparing a coating liquid for a protective layer, a step of forming a coated film of the coating liquid for a protective layer on the photosensitive layer, and a step of curing the coated film.

[Method of Forming a Surface Shape of the Electrophotographic Photosensitive Member]

For the purpose of more stabilizing the behavior of a cleaning blade brought into contact with the electrophotographic photosensitive member, it is more preferable that the surface layer of the electrophotographic photosensitive member be provided with depressed-shape portions or protruding-shape portions.

The depressed-shape portions or the protruding-shape portions may be formed on the entire region of the surface of the electrophotographic photosensitive member, or may be formed on part of the surface of the electrophotographic photosensitive member. When the depressed-shape portions or the protruding-shape portions are formed on part of the surface of the electrophotographic photosensitive member, it is preferable that the depressed-shape portions or the protruding-shape portions be formed at least on the entire region of the contact region with the cleaning blade.

For example, in the case of forming depressed-shape portions, a mold having protrusions corresponding to the depressed-shape portions to be formed is brought into pressure contact with the surface of the electrophotographic photosensitive member to transfer the shape, whereby the depressed-shape portions can be formed.

Figure 3:
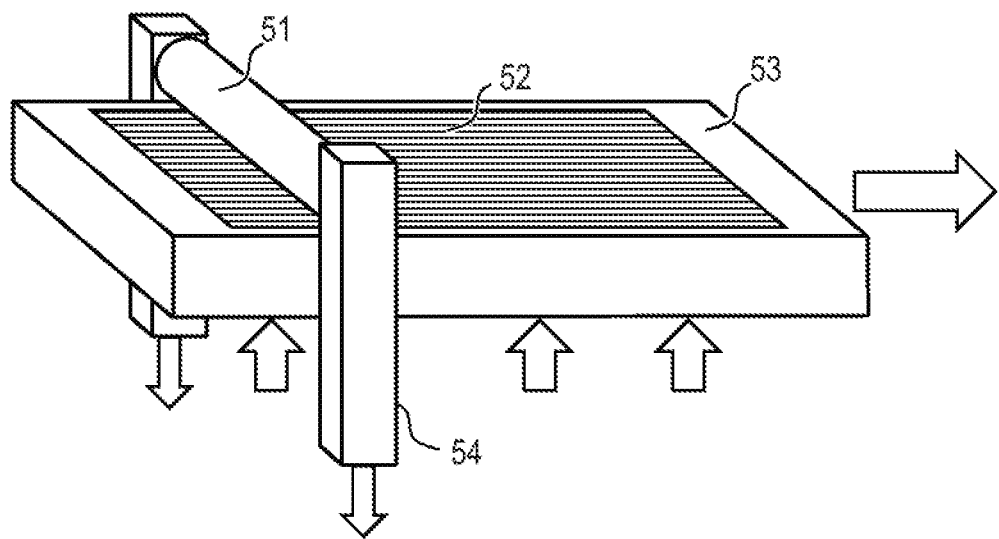
FIG. 3 is a schematic view of a pressure contact shape transfer processing apparatus.

FIG. 3 illustrates an example of a pressure contact shape transfer processing apparatus to form depressed-shape portions on the surface of the electrophotographic photosensitive member.

According to the pressure contact shape transfer processing apparatus illustrated in FIG. 3, by bringing the surface (peripheral surface) of an electrophotographic photosensitive member before formation of depressed-shape portions, 51, which is a workpiece, (hereinafter, also referred to as "electrophotographic photosensitive member 51"), continuously into pressure contact with a mold 52 while the electrophotographic photosensitive member 51 is being rotated, depressed-shape portions and flat portions can be formed on the surface of the electrophotographic photosensitive member 51.

Examples of the material of a pressing member 53 include metals, metal oxides, plastics and glass. Among these, from the viewpoint of the mechanical strength, the dimensional accuracy and the durability, stainless steel (SUS) is preferable. The pressing member 53 is installed with a mold 52 on the upper surface. A supporting member (not illustrated in figure) installed on the lower surface side and a pressing system (no illustrated in figure) can cause the mold 52 to contact at a predetermined pressure with the surface of the electrophotographic photosensitive member 51 supported on a supporting member 54. The supporting member 54 may be pressed at a predetermined pressure onto the pressing member 53, or the supporting member 54 and the pressing member 53 may be pressed against each other.

The example illustrated in FIG. 3 is an example in which by moving the pressing member 53 in the direction perpendicular to the axial direction of the electrophotographic photosensitive member 51, the surface of the electrophotographic photosensitive member 51 is continuously processed while the electrophotographic photosensitive member 51 is being drivenly or drivingly rotated. Alternatively, by fixing the pressing member 53 and moving the supporting member 54 in the direction perpendicular to the axial direction of the electrophotographic photosensitive member 51, or by moving both of the supporting member 54 and the pressing member 53, the surface of the electrophotographic photosensitive member 51 can also continuously be processed.

From the viewpoint of efficiently carrying out the shape transfer, it is preferable that the mold 52 and the electrophotographic photosensitive member 51 be heated.

Examples of the mold 52 include finely surface-processed metals and resin films, and silicon wafers whose surface has been patterned with a resist. The examples further include resin films having dispersed microparticles, and finely surface-shaped resin films coated with a metal.

From the viewpoint of making uniform the pressure of pressing the mold 52 onto the electrophotographic photosensitive member 51, it is preferable that an elastic body be installed between the mold 52 and the pressing member 53.

[Process Cartridge, Electrophotographic Apparatus]

The process cartridge according to the present invention integrally supports the electrophotographic photosensitive member according to the present invention and at least one unit selected from the group consisting of a charging unit, a developing unit and a cleaning unit, and is detachably attachable to the main body of an electrophotographic apparatus.

The electrophotographic image forming apparatus according to the present invention has the electrophotographic photosensitive member according to the present invention and at least one unit selected from the group consisting of a charging unit, an exposure unit, a developing unit and a transfer unit.

FIG. 1 illustrates one example of a schematic constitution of an electrophotographic image forming apparatus having a process cartridge provided with an electrophotographic photosensitive member.

The cylindrical electrophotographic photosensitive member 1 (hereinafter, also referred to as "electrophotographic photosensitive member") is rotationally driven centered on a shaft 2 in the arrow direction at a predetermined peripheral speed. The surface of the electrophotographic photosensitive member 1 is charged at a positive or negative predetermined potential by a charging unit 3. Here, in the figure, a roller charging system using a roller-type charging member is illustrated, but a charging system may be adopted, such as a corona charging system, a proximity charging system or an injection charging system. The surface of the charged electrophotographic photosensitive member 1 is irradiated with exposure light 4 from an exposure unit (not illustrated in figure) to form electrostatic latent images corresponding to the target image information. The electrostatic latent images formed on the surface of the electrophotographic photosensitive member 1 are developed with a toner accommodated in a developing unit 5 to form toner images on the surface of the electrophotographic photosensitive member 1. The toner images formed on the surface of the electrophotographic photosensitive member 1 are transferred to a transfer material 7 by a transfer unit 6. The transfer material 7 to which the toner images have been transferred is conveyed to a fixing unit 8 to subject the toner images to a fixing treatment, and printed out outside an electrophotographic apparatus. The electrophotographic apparatus may have a cleaning unit 9 to remove deposits such as the toner remaining on the surface of the electrophotographic photosensitive member 1 after the transfer. Alternatively, without separately installing the cleaning unit 9, a so-called cleanerless system which removes the deposits by a developing unit 5 or the like may be used. The electrophotographic image forming apparatus may have a neutralization mechanism to neutralize the surface of the electrophotographic photosensitive member 1 with the exposure light 10 from the exposure unit (not illustrated in figure). In order to detachably attach the process cartridge 11 according to the present invention to the main body of the electrophotographic image forming apparatus, a guiding unit 12 such as rails may be installed.

The electrophotographic photosensitive member according to the present invention can be used for laser beam printers, LED printers, copying machines, facsimiles and multifunction printers thereof.

EXAMPLES

Hereinafter, the present invention will be described in more detail by way of Examples and Comparative Examples. The present invention is not any more limited to the following Examples so far as the gist thereof is not deviated. Here, in the following Examples, "parts" is in terms of mass unless otherwise specified.

Example 1

An aluminum cylinder of 30 mm in diameter, 357.5 mm in length and 1 mm in wall thickness was used as a supporting member (conductive supporting member).

Then, 100 parts of a zinc oxide particle (specific surface area: 19 m$^2$/g, powder resistance: $4.7 \times 10^6$ Ω·cm) and 500 parts of toluene were stirred and mixed, and 0.8 parts of a silane coupling agent was added thereto and stirred for 6 hours. Thereafter, toluene was vacuum distilled away, and the resultant was heated and dried at 130° C. for 6 hours to thereby obtain a surface-treated zinc oxide particle. The silane coupling agent used was KBM602 (compound name: N-2-(aminoethyl)-3-aminopropylmethyldimethoxysilane), manufactured by Shin-Etsu Chemical Co., Ltd.

Then, 15 parts of a polyvinyl butyral resin (trade name: BM-1, manufactured by Sekisui Chemical Co., Ltd., weight-average molecular weight: 40,000) as a polyol resin and 15 parts of a blocked isocyanate (trade name: Sumidule 3175, manufactured by Sumika Covestro Urethane Co., Ltd. (former: Sumika Bayer Urethane Co., Ltd.) were provided. These were dissolved in a mixed solution of 73.5 parts of methyl ethyl ketone and 73.5 parts of 1-butanol. 80.8 parts of the surface-treated zinc oxide particle and 0.8 parts of 2,3,4-trihydroxybenzophenone (manufactured by Tokyo Chemical Industry Co., Ltd.) were added to the solution, and the resultant was dispersed in an atmosphere of 23±3° C. for 3 hours by a sand mill using glass beads of 0.8 mm in diameter. After the dispersing, 0.01 parts of a silicone oil (trade name: SH28PA, manufactured by Dow Corning Toray Co., Ltd.) and 5.6 parts of a crosslinked polymethylmethacrylate (PMMA) particle (trade name: Techpolymer SSX-103, manufactured by Sekisui Plastics Co., Ltd., average primary particle size: 3 μm) were added and stirred to thereby prepare a coating liquid for an undercoat layer.

The aluminum cylinder was dip coated with the coating liquid for an undercoat layer to thereby form a coated film; and the obtained coated film was dried for 40 min at 160° C. to thereby form an undercoat layer of 18 μm in film thickness.

Then, 20 parts of a hydroxygallium phthalocyanine crystal having intense peaks at 7.4° and 28.2° in the Bragg angle, 2θ±0.2°, in CuKα characteristic X-ray diffraction was provided. In addition thereto, 0.2 parts of a compound represented by the following formula (A), and 10 parts of a polyvinyl butyral resin (trade name: S-Lec BX-1, manufactured by Sekisui Chemical Co., Ltd.) were provided. These and 600 parts of cyclohexanone were stirred and mixed in a sand mill using glass beads of 1 mm in diameter to be thereby dispersed. Thereafter, 700 parts of ethyl acetate was added to the dispersion liquid to thereby prepare a coating liquid for a charge generation layer. The undercoat layer was dip coated with the coating liquid for a charge generation layer to thereby form a coated film, and the obtained coated film was heated and dried in an oven at a temperature of 80° C. for 15 min to thereby form a charge generation layer of 0.17 μm in film thickness.

(A)

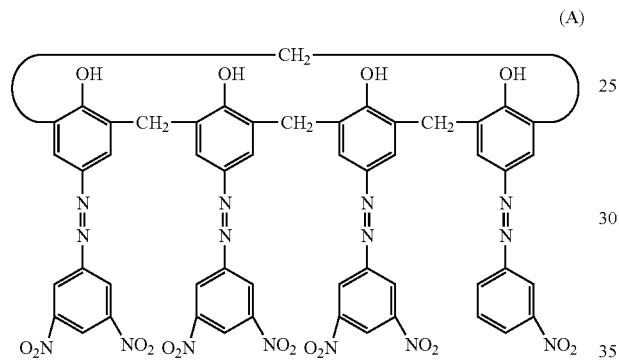

Then, 30 parts of a compound (charge transporting substance) represented by the following formula (B), 60 parts of a compound (charge transporting substance) represented by the following formula (C), 10 parts of a compound represented by the following formula (D), 100 parts of a polycarbonate resin (trade name: Iupilon Z400, manufactured by Mitsubishi-Engineering Plastics Corp., bisphenol Z type), and 0.02 parts of a polycarbonate (viscosity-average molecular weight Mv: 20,000) having a structural unit represented by the following formula (E) were dissolved in a mixed solvent of 600 parts of xylene and 200 parts of dimethoxymethane to thereby prepare a coating liquid for a charge transport layer. The charge generation layer was dip coated with the coating liquid for a charge transport layer to thereby form a coated film, and the obtained coated film was dried for 30 min at 100° C. to thereby form a charge transport layer of 18 μm in film thickness.

(B)

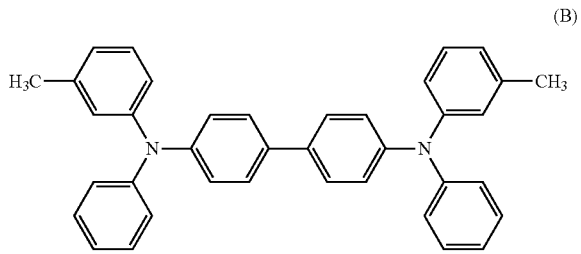

(C)

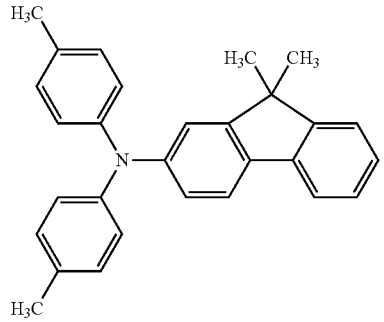

(D)

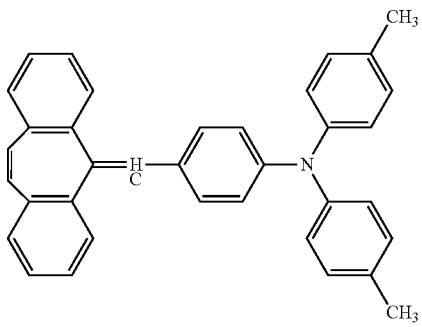

(E)

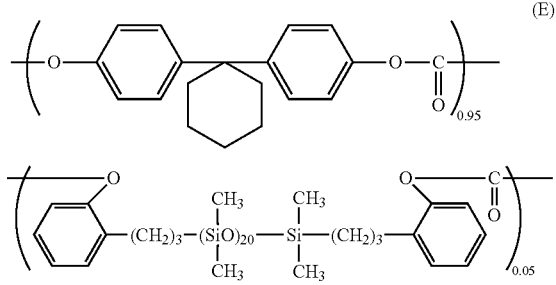

wherein in the formula (E), 0.95 and 0.05 are molar ratios (copolymerization ratios) of two structural units.

Then, 0.5 parts (0.5% based on the total mass of the composition) of the compound (exemplary compound 1-15) represented by the formula (1), 84.5 parts (84.5% based on the total mass of the composition) of the hole transporting compound having two or more (meth)acryloyloxy groups (exemplary compound 2-7) represented by the formula (2), 15.0 parts (15.0% based on the total mass of the composition) of the compound (exemplary compound 3-3) represented by the formula (3), 40 parts of a polytetrafluoroethylene particle (Lubron L-2, manufactured by Daikin Industries, Ltd.), 5 parts of a fluorine-containing acrylic resin (weight-average molecular weight: 83,000, copolymerization ratio (F1)/(F2)=1/1 (molar ratio)) having a repeating structural unit represented by the following formula (F1) and a repeating structural unit represented by the following formula (F2), 110 parts of 1-propanol, and 110 parts of 1,1,2,2,3,3,4-heptafluorocyclopentane (trade name: Zeolora H, manufactured by Zeon Corp.) were mixed, and thereafter, the resultant solution was dispersed by an ultra-high-speed dispersing machine. Thereafter, the resultant solution was filtered with a Polyflon filter (trade name: PF-060, manufactured by Advantec Toyo Co., Ltd.) to thereby prepare a coating liquid for a protective layer.

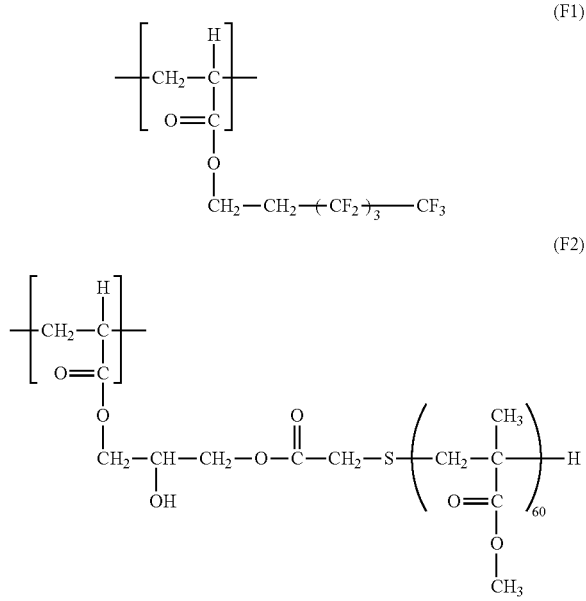

The charge transport layer was dip coated with the coating liquid for a protective layer to thereby form a coated film. The obtained coated film was dried for 5 min at 50° C. Then, the coated film was irradiated for 1.5 sec with electron beams under the condition of an acceleration voltage of 70 kV and a beam current of 5.0 mA in a nitrogen atmosphere while the supporting member (body to be irradiated) was being rotated at a speed of 200 rpm. Then, the temperature of the coated film was raised from 25° C. up to 130° C. over 15 sec to thereby cure the coated film. The absorbed dose of the electron beams at this time was measured and was 15 kGy, and the oxygen concentration from the electron irradiation until the heat treatment thereafter was 20 ppm or lower. Then, the resultant coated film was allowed to naturally cool until the temperature of the coated film became 25° C., and thereafter, heated for 15 min at 100° C. to thereby form a protective layer of 5 μm in film thickness.

An electrophotographic photosensitive member having the protective layer before formation of depressions was thus fabricated.

Then, a mold member (mold) was installed on a pressure contact shape transfer processing apparatus, and a surface processing was carried out on the fabricated electrophotographic photosensitive member before formation of depressions.

Figure 4A:
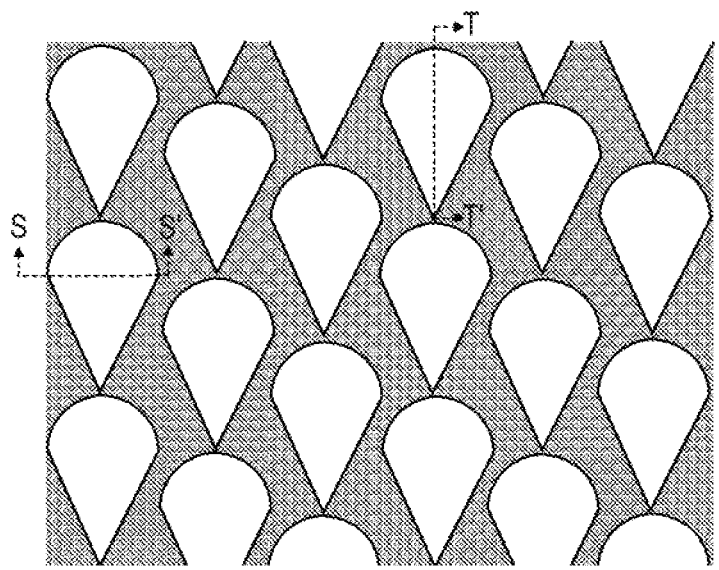
FIG. 4A is a top view of a mold.
Figure 4B:
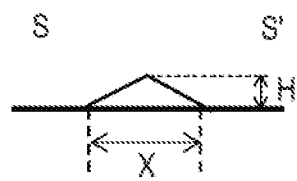
FIG. 4B is a cross-sectional view of the mold.
Figure 4C:
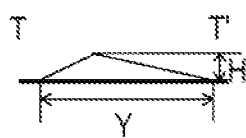
FIG. 4C is a cross-sectional view of the mold.

Specifically, a mold illustrated in FIG. 4A, FIG. 4B and FIG. 4C was installed on a pressure contact shape transfer processing apparatus having a constitution schematically illustrated in FIG. 3, and a surface processing was carried out on the fabricated electrophotographic photosensitive member before formation of depressed-shape portions, 51. FIG. 4A, FIG. 4B and FIG. 4C are views illustrating the mold used in Examples and Comparative Examples. FIG. 4A is a top view schematically illustrating the mold, and FIG. 4B is a schematic cross-sectional view (S-S' cross section in FIG. 4A) of a protrusion of the mold in the axial direction of the electrophotographic photosensitive member. FIG. 4C is a cross-sectional view (T-T' cross section in FIG. 4A) of the protrusion of the mold in the peripheral direction of the electrophotographic photosensitive member. In the mold illustrated in FIG. 4A, FIG. 4B and FIG. 4C, the protrusions were in such a protruding shape that the maximum width X of the protrusions (maximum width in the axial direction of the electrophotographic photosensitive member of the protrusions on the mold viewed from above) was 50 μm; the maximum length Y thereof (maximum length in the peripheral direction of the electrophotographic photosensitive member of the protrusions on the mold viewed from above) was 75 μm; the area proportion thereof was 56%; and the height H thereof was 4 μm. Here, the area proportion was a proportion of the areas of the protruding-shape portions in the entire surface of the mold when the mold was viewed from above. In the processing time, the temperatures of the electrophotographic photosensitive member 51 and the mold were controlled so that the temperature of the surface of the electrophotographic photosensitive member 51 became 120° C. Then, depressed-shape portions were formed on the entire surface of the surface layer (peripheral surface) of the electrophotographic photosensitive member 51 by rotating the electrophotographic photosensitive member 51 in the peripheral direction while the electrophotographic photosensitive member 51 and the pressing member were pressed at a pressure of 7.0 MPa to the mold. An electrophotographic photosensitive member 1 was thus produced.

The surface of the obtained electrophotographic photosensitive member was magnified and observed through a 50× lens by a laser microscope (trade name: X-100, manufactured by Keyence Corp.) to observe the depressed-shape portions formed on the surface of the electrophotographic photosensitive member. The observation was carried out by being so regulated that no inclination arises in the longitudinal direction of the electrophotographic photosensitive member and that with regard to the peripheral direction, the top of an arc of the electrophotographic photosensitive member was brought into focus. The observed magnified images were connected by an image connection application to thereby obtain a square region of 500 μm in one side. Then, for the obtained result, image-processed height data was selected and filter processing with a filter type median was carried out by attached image analysis software.

As a result of the above observation, the depth of the depressed-shape portion was 2 μm; the width of the opening in the axial direction was 50 μm; the length of the opening in the peripheral direction was 75 μm; and the area was 140,000 μm². Here, the area was an area of the depressed-shape portions when the surface of the electrophotographic photosensitive member was viewed from above, and meant an area of the openings of the depressed-shape portions.

An electrophotographic photosensitive member 1 was thus produced.

Example 2

An electrophotographic photosensitive member was produced as in Example 1, except for changing the exemplary compound 1-15 contained in the coating liquid for a protective layer to the exemplary compound 1-16.

Example 3

An electrophotographic photosensitive member was produced as in Example 1, except for changing the exemplary compound 1-15 contained in the coating liquid for a protective layer to the exemplary compound 1-1.

Example 4

An electrophotographic photosensitive member was produced as in Example 1, except for changing the amount of the exemplary compound 1-15 contained in the coating liquid for a protective layer from 0.5 parts to 1.0 part, and the amount of the exemplary compound 2-7 from 84.5 parts to 84.0 parts.

Example 5

An electrophotographic photosensitive member was produced as in Example 1, except for changing the amount of the exemplary compound 1-15 contained in the coating liquid for a protective layer from 0.5 parts to 2.0 parts, and the amount of the exemplary compound 2-7 from 84.5 parts to 83.0 parts.

Example 6

An electrophotographic photosensitive member was produced as in Example 1, except for changing the exemplary compound 2-7 contained in the coating liquid for a protective layer to the exemplary compound 2-5.

Example 7

An electrophotographic photosensitive member was produced as in Example 1, except for changing the exemplary compound 2-7 contained in the coating liquid for a protective layer to the exemplary compound 2-2.

Example 8

An electrophotographic photosensitive member was produced as in Example 1, except for changing the amount of the exemplary compound 2-7 contained in the coating liquid for a protective layer from 84.5 parts to 99.5 parts, and using no exemplary compound 3-3.

Example 9

An electrophotographic photosensitive member was produced as in Example 1, except for changing the amount of the exemplary compound 2-7 contained in the coating liquid for a protective layer from 84.5 parts to 96.5 parts, and the amount of the exemplary compound 3-3 from 15.0 parts to 3.0 parts.

Example 10

An electrophotographic photosensitive member was produced as in Example 1, except for changing the amount of the exemplary compound 2-7 contained in the coating liquid for a protective layer from 84.5 parts to 94.5 parts, and the amount of the exemplary compound 3-3 from 15.0 parts to 5.0 parts.

Example 11

An electrophotographic photosensitive member was produced as in Example 1, except for changing the amount of the exemplary compound 2-7 contained in the coating liquid for a protective layer from 84.5 parts to 49.5 parts, and the amount of the exemplary compound 3-3 from 15.0 parts to 50.0 parts.

Example 12

An electrophotographic photosensitive member was produced as in Example 1, except for changing the amount of the exemplary compound 2-7 contained in the coating liquid for a protective layer from 84.5 parts to 44.5 parts, and the amount of the exemplary compound 3-3 from 15.0 parts to 55.0 parts.

Example 13

An electrophotographic photosensitive member was produced as in Example 1, except for changing the exemplary compound 3-3 contained in the coating liquid for a protective layer to the exemplary compound 3-2.

Example 14

An electrophotographic photosensitive member was produced as in Example 1, except for changing the exemplary compound 3-3 contained in the coating liquid for a protective layer to the exemplary compound 3-1.

Example 15

An electrophotographic photosensitive member was produced as in Example 9, except for changing the exemplary compound 3-3 contained in the coating liquid for a protective layer to the exemplary compound 3-1.

Example 16

An electrophotographic photosensitive member was produced as in Example 10, except for changing the exemplary compound 3-3 contained in the coating liquid for a protective layer to the exemplary compound 3-1.

Example 17

An electrophotographic photosensitive member was produced as in Example 11, except for changing the exemplary compound 3-3 contained in the coating liquid for a protective layer to the exemplary compound 3-1.

Example 18

An electrophotographic photosensitive member was produced as in Example 12, except for changing the exemplary compound 3-3 contained in the coating liquid for a protective layer to the exemplary compound 3-1.

Example 19

An electrophotographic photosensitive member was produced as in Example 8, except for changing the exemplary compound 2-7 contained in the coating liquid for a protective layer to the exemplary compound 2-2.

Example 20

An electrophotographic photosensitive member was produced as in Example 19, except for changing the amount of the exemplary compound 1-15 contained in the coating liquid for a protective layer from 0.5 parts to 1.0 part, and the amount of the exemplary compound 2-2 from 99.5 parts to 99.0 parts.

Example 21

An electrophotographic photosensitive member was produced as in Example 19, except for changing the amount of the exemplary compound 1-15 contained in the coating liquid for a protective layer from 0.5 parts to 2 parts, and the amount of the exemplary compound 2-2 from 99.5 parts to 98.0 parts.

Example 22

An electrophotographic photosensitive member was produced as in Example 1, except for changing the amount of the exemplary compound 1-15 contained in the coating liquid for a protective layer from 0.5 parts to 2.0 parts, the amount of the exemplary compound 2-7 from 84.5 parts to 95.0 parts, and the amount of the exemplary compound 3-3 from 15.0 parts to 3.0 parts.

Example 23

An electrophotographic photosensitive member was produced as in Example 1, except for changing the amount of the exemplary compound 1-15 contained in the coating liquid for a protective layer from 0.5 parts to 2.0 parts, the amount of the exemplary compound 2-7 from 84.5 parts to 43.0 parts, and the amount of the exemplary compound 3-3 from 15.0 parts to 55.0 parts.

Example 24

An electrophotographic photosensitive member was produced as in Example 5, except for changing the exemplary compound 3-3 contained in the coating liquid for a protective layer to the exemplary compound 3-1.

Example 25

An electrophotographic photosensitive member was produced as in Example 24, except for changing the exemplary compound 2-7 contained in the coating liquid for a protective layer to the exemplary compound 2-2.

Example 26

An electrophotographic photosensitive member was produced as in Example 8, except for changing the amount of the exemplary compound 1-15 contained in the coating liquid for a protective layer from 0.5 parts to 1.0 part, and the amount of the exemplary compound 2-7 from 99.5 parts to 99.0 parts.

Example 27

An electrophotographic photosensitive member was produced as in Example 8, except for changing the amount of the exemplary compound 1-15 contained in the coating liquid for a protective layer from 0.5 parts to 2.0 part, and the amount of the exemplary compound 2-2 from 99.5 parts to 98.0 parts.

Example 28

An electrophotographic photosensitive member was produced as in Example 1, except for changing the exemplary compound 3-3 contained in the coating liquid for a protective layer to the exemplary compound 4-1.

Example 29

An electrophotographic photosensitive member was produced as in Example 9, except for changing the exemplary compound 3-3 contained in the coating liquid for a protective layer to the exemplary compound 4-1.

Example 30

An electrophotographic photosensitive member was produced as in Example 10, except for changing the exemplary compound 3-3 contained in the coating liquid for a protective layer to the exemplary compound 4-1.

Example 31

An electrophotographic photosensitive member was produced as in Example 11, except for changing the exemplary compound 3-3 contained in the coating liquid for a protective layer to the exemplary compound 4-1.

Example 32

An electrophotographic photosensitive member was produced as in Example 12, except for changing the exemplary compound 3-3 contained in the coating liquid for a protective layer to the exemplary compound 4-1.

Example 33

An electrophotographic photosensitive member was produced as in Example 1, except for changing the exemplary compound 3-3 contained in the coating liquid for a protective layer to the exemplary compound 5-3.

Example 34

An electrophotographic photosensitive member was produced as in Example 9, except for changing the exemplary compound 3-3 contained in the coating liquid for a protective layer to the exemplary compound 5-3.

Example 35

An electrophotographic photosensitive member was produced as in Example 10, except for changing the exemplary compound 3-3 contained in the coating liquid for a protective layer to the exemplary compound 5-3.

Example 36

An electrophotographic photosensitive member was produced as in Example 11, except for changing the exemplary compound 3-3 contained in the coating liquid for a protective layer to the exemplary compound 5-3.

Example 37

An electrophotographic photosensitive member was produced as in Example 12, except for changing the exemplary compound 3-3 contained in the coating liquid for a protective layer to the exemplary compound 5-3.

Example 38

An electrophotographic photosensitive member was produced as in Example 1, except for changing the exemplary compound 3-3 contained in the coating liquid for a protective layer to the exemplary compound 6-1.

Example 39

An electrophotographic photosensitive member was produced as in Example 9, except for changing the exemplary compound 3-3 contained in the coating liquid for a protective layer to the exemplary compound 6-1.

Example 40

An electrophotographic photosensitive member was produced as in Example 10, except for changing the exemplary compound 3-3 contained in the coating liquid for a protective layer to the exemplary compound 6-1.

Example 41

An electrophotographic photosensitive member was produced as in Example 11, except for changing the exemplary compound 3-3 contained in the coating liquid for a protective layer to the exemplary compound 6-1.

Example 42

An electrophotographic photosensitive member was produced as in Example 12, except for changing the exemplary compound 3-3 contained in the coating liquid for a protective layer to the exemplary compound 6-1.

Comparative Example 1

An electrophotographic photosensitive member was produced as in Example 6, except for changing the exemplary compound 1-15 contained in the coating liquid for a protective layer to a compound represented by the following formula (C-1).

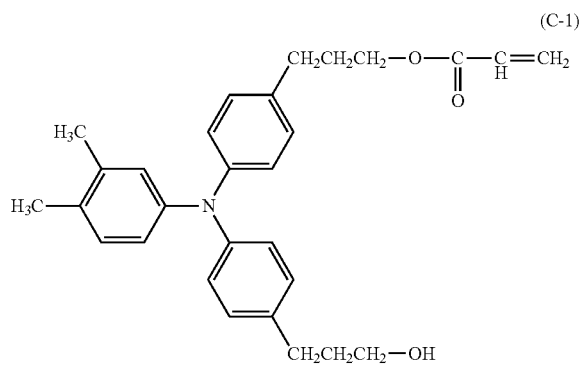

Comparative Example 2

An electrophotographic photosensitive member was produced as in Example 21, except for changing the exemplary compound 1-15 contained in the coating liquid for a protective layer to the compound represented by the above formula (C-1).

[Evaluations]

The electrophotographic photosensitive members produced in Examples and Comparative Examples were each mounted on a cyan station of a remodeled machine of an electrophotographic apparatus (copying machine)(trade name: iR-ADV C5255, Canon Inc.) as an evaluation apparatus. Evaluations under the following conditions were carried out.

(Evaluation of the Environmental Fluctuation)

In each of a low-temperature low-humidity environment of a temperature of 15° C. and a humidity of 10% RH and a high-temperature high-humidity environment of a temperature of 30° C. and a humidity of 80% RH, the formation of an image using a test chart having an image ratio of 1% was carried out continuously on 1,000 sheets of A4 paper in lateral size to examine the potential fluctuation of an electrophotographic photosensitive member. The potential fluctuation was calculated as a value, $\Delta VL$, of "a potential after the 1,000 sheets—an initial potential" of an image exposure part VL.

Then, $\Delta VL$ in the low-temperature low-humidity environment was taken as $\Delta VL(LL)$, and $\Delta VL$ in the high-temperature high-humidity environment was taken as $\Delta VL(HH)$, and a value of "the $\Delta VL(HH)$–the $\Delta VL(LL)$" was calculated as a result of the environmental fluctuation.

In the present invention, when the environmental fluctuation "$\Delta VL(HH)$–$\Delta VL(LL)$" was lower than 20 V, and $\Delta VL(LL)$ and $\Delta VL(HH)$ were each lower than 30 V, the characteristics of the electrophotographic photosensitive member were considered to pose no problem.

(Evaluation of the Wear Loss)

In an environment of a temperature of 23° C. and a humidity of 50% RH, the formation of an image using a test chart having an image ratio of 5% was carried out continuously on 100,000 sheets of A4 paper in lateral size to check the wear loss (μm) of an electrophotographic photosensitive member. In the present invention, when the wear loss is lower than 1.0 μm, the wear resistance of the electrophotographic photosensitive member was considered to pose no problem.

Evaluation results of Examples 1 to 42 and Comparative Examples 1 and 2 are shown in Table 1.

TABLE 1

| | Compound represented by formula (1) (parts by mass) | | Hole transporting compound having two or more (meth)acryloyloxy groups (parts by mass) | | Compounds represented by formulas (3), (4), (5), (6) (parts by mass) | | Potential fluctuation (V) | | Environmental fluctuation (V) | Wear loss |
|---|---|---|---|---|---|---|---|---|---|---|
| | | | | | | | $\Delta VL(LL)$ | $\Delta VL(HH)$ | $\Delta VL(HH)-\Delta VL(LL)$ | (μm) |
| Example 1 | exemplary compound 1-15 | 0.5 | exemplary compound 2-7 | 84.5 | exemplary compound 3-3 | 15.0 | 4 | 6 | 2 | 0.5 |
| Example 2 | exemplary compound 1-16 | 0.5 | exemplary compound 2-7 | 84.5 | exemplary compound 3-3 | 15.0 | 5 | 7 | 2 | 0.4 |
| Example 3 | exemplary compound 1-1 | 0.5 | exemplary compound 2-7 | 84.5 | exemplary compound 3-3 | 15.0 | 5 | 8 | 3 | 0.5 |
| Example 4 | exemplary compound 1-15 | 1.0 | exemplary compound 2-7 | 84.0 | exemplary compound 3-3 | 15.0 | 4 | 7 | 3 | 0.6 |
| Example 5 | exemplary compound 1-15 | 2.0 | exemplary compound 2-7 | 83.0 | exemplary compound 3-3 | 15.0 | 5 | 7 | 2 | 0.7 |
| Example 6 | exemplary compound 1-15 | 0.5 | exemplary compound 2-5 | 84.5 | exemplary compound 3-3 | 15.0 | 4 | 7 | 3 | 0.5 |

TABLE 1-continued

| | Compound represented by formula (1) (parts by mass) | | Hole transporting compound having two or more (meth)acryloyloxy groups (parts by mass) | | Compounds represented by formulas (3), (4), (5), (6) (parts by mass) | | Potential fluctuation (V) ΔVL(LL) | Potential fluctuation (V) ΔVL(HH) | Environmental fluctuation (V) ΔVL(HH)-ΔVL(LL) | Wear loss (μm) |
|---|---|---|---|---|---|---|---|---|---|---|
| Example 7 | exemplary compound 1-15 | 0.5 | exemplary compound 2-2 | 84.5 | exemplary compound 3-3 | 15.0 | 5 | 10 | 5 | 0.4 |
| Example 8 | exemplary compound 1-15 | 0.5 | exemplary compound 2-7 | 99.5 | none | | 4 | 15 | 11 | 0.8 |
| Example 9 | exemplary compound 1-15 | 0.5 | exemplary compound 2-7 | 96.5 | exemplary compound 3-3 | 3.0 | 4 | 10 | 6 | 0.6 |
| Example 10 | exemplary compound 1-15 | 0.5 | exemplary compound 2-7 | 94.5 | exemplary compound 3-3 | 5.0 | 4 | 6 | 2 | 0.5 |
| Example 11 | exemplary compound 1-15 | 0.5 | exemplary compound 2-7 | 49.5 | exemplary compound 3-3 | 50.0 | 7 | 8 | 1 | 0.4 |
| Example 12 | exemplary compound 1-15 | 0.5 | exemplary compound 2-7 | 44.5 | exemplary compound 3-3 | 55.0 | 10 | 11 | 1 | 0.3 |
| Example 13 | exemplary compound 1-15 | 0.5 | exemplary compound 2-7 | 84.5 | exemplary compound 3-2 | 15.0 | 5 | 8 | 3 | 0.5 |
| Example 14 | exemplary compound 1-15 | 0.5 | exemplary compound 2-7 | 84.5 | exemplary compound 3-1 | 15.0 | 5 | 10 | 5 | 0.5 |
| Example 15 | exemplary compound 1-15 | 0.5 | exemplary compound 2-7 | 96.5 | exemplary compound 3-1 | 3.0 | 5 | 13 | 8 | 0.6 |
| Example 16 | exemplary compound 1-15 | 0.5 | exemplary compound 2-7 | 94.5 | exemplary compound 3-1 | 5.0 | 4 | 9 | 5 | 0.5 |
| Example 17 | exemplary compound 1-15 | 0.5 | exemplary compound 2-7 | 49.5 | exemplary compound 3-1 | 50.0 | 5 | 10 | 5 | 0.4 |
| Example 18 | exemplary compound 1-15 | 0.5 | exemplary compound 2-7 | 44.5 | exemplary compound 3-1 | 55.0 | 10 | 12 | 2 | 0.4 |
| Example 19 | exemplary compound 1-15 | 0.5 | exemplary compound 2-2 | 99.5 | none | | 4 | 16 | 12 | 0.7 |
| Example 20 | exemplary compound 1-15 | 1.0 | exemplary compound 2-2 | 99.0 | none | | 4 | 17 | 13 | 0.7 |
| Example 21 | exemplary compound 1-15 | 2.0 | exemplary compound 2-2 | 98.0 | none | | 5 | 18 | 13 | 0.9 |
| Example 22 | exemplary compound 1-15 | 2.0 | exemplary compound 2-7 | 95.0 | exemplary compound 3-3 | 3.0 | 4 | 10 | 6 | 0.8 |
| Example 23 | exemplary compound 1-15 | 2.0 | exemplary compound 2-7 | 43.0 | exemplary compound 3-3 | 55.0 | 11 | 13 | 2 | 0.6 |
| Example 24 | exemplary compound 1-15 | 2.0 | exemplary compound 2-7 | 83.0 | exemplary compound 3-1 | 15.0 | 5 | 11 | 6 | 0.7 |
| Example 25 | exemplary compound 1-15 | 2.0 | exemplary compound 2-2 | 83.0 | exemplary compound 3-1 | 15.0 | 4 | 14 | 10 | 0.7 |
| Example 26 | exemplary compound 1-15 | 1.0 | exemplary compound 2-7 | 99.0 | none | | 5 | 16 | 11 | 0.7 |
| Example 27 | exemplary compound 1-15 | 2.0 | exemplary compound 2-7 | 98.0 | none | | 5 | 17 | 12 | 0.9 |
| Example 28 | exemplary compound 1-15 | 0.5 | exemplary compound 2-7 | 84.5 | exemplary compound 4-1 | 15.0 | 5 | 9 | 4 | 0.4 |
| Example 29 | exemplary compound 1-15 | 0.5 | exemplary compound 2-7 | 96.5 | exemplary compound 4-1 | 3.0 | 5 | 14 | 9 | 0.5 |
| Example 30 | exemplary compound 1-15 | 0.5 | exemplary compound 2-7 | 94.5 | exemplary compound 4-1 | 5.0 | 4 | 9 | 5 | 0.4 |
| Example 31 | exemplary compound 1-15 | 0.5 | exemplary compound 2-7 | 49.5 | exemplary compound 4-1 | 50.0 | 5 | 10 | 5 | 0.3 |
| Example 32 | exemplary compound 1-15 | 0.5 | exemplary compound 2-7 | 44.5 | exemplary compound 4-1 | 55.0 | 10 | 12 | 2 | 0.3 |
| Example 33 | exemplary compound 1-15 | 0.5 | exemplary compound 2-7 | 84.5 | exemplary compound 5-3 | 15.0 | 6 | 10 | 4 | 0.3 |
| Example 34 | exemplary compound 1-15 | 0.5 | exemplary compound 2-7 | 96.5 | exemplary compound 5-3 | 3.0 | 5 | 14 | 9 | 0.4 |
| Example 35 | exemplary compound 1-15 | 0.5 | exemplary compound 2-7 | 94.5 | exemplary compound 5-3 | 5.0 | 5 | 10 | 5 | 0.3 |
| Example 36 | exemplary compound 1-15 | 0.5 | exemplary compound 2-7 | 49.5 | exemplary compound 5-3 | 50.0 | 5 | 11 | 6 | 0.2 |
| Example 37 | exemplary compound 1-15 | 0.5 | exemplary compound 2-7 | 44.5 | exemplary compound 5-3 | 55.0 | 11 | 15 | 4 | 0.2 |
| Example 38 | exemplary compound 1-15 | 0.5 | exemplary compound 2-7 | 84.5 | exemplary compound 6-1 | 15.0 | 4 | 10 | 6 | 0.5 |
| Example 39 | exemplary compound 1-15 | 0.5 | exemplary compound 2-7 | 96.5 | exemplary compound 6-1 | 3.0 | 4 | 12 | 8 | 0.6 |
| Example 40 | exemplary compound 1-15 | 0.5 | exemplary compound 2-7 | 94.5 | exemplary compound 6-1 | 5.0 | 3 | 9 | 6 | 0.5 |
| Example 41 | exemplary compound 1-15 | 0.5 | exemplary compound 2-7 | 49.5 | exemplary compound 6-1 | 50.0 | 4 | 10 | 6 | 0.4 |
| Example 42 | exemplary compound 1-15 | 0.5 | exemplary compound 2-7 | 44.5 | exemplary compound 6-1 | 55.0 | 9 | 13 | 4 | 0.4 |
| Comparative Example 1 | C-1 | 0.5 | exemplary compound 2-5 | 84.5 | exemplary compound 3-3 | 15.0 | 8 | 30 | 22 | 0.5 |

TABLE 1-continued

| | Compound represented by formula (1) (parts by mass) | Hole transporting compound having two or more (meth)acryloyloxy groups (parts by mass) | | Compounds represented by formulas (3), (4), (5), (6) (parts by mass) | Potential fluctuation (V) | | Environmental fluctuation (V) ΔVL(HH)-ΔVL(LL) | Wear loss (μm) |
|---|---|---|---|---|---|---|---|---|
| | | | | | ΔVL(LL) | ΔVL(HH) | | |
| Comparative Example 2 | C-1 2.0 | exemplary compound 2-2 | 98.0 | none | 7 | 34 | 27 | 0.7 |

As results of the evaluations, in Examples, the potential fluctuation and the environmental fluctuation in repeated use in the high-temperature high-humidity environment were sufficiently suppressed, posing no problem. In Comparative Examples, the potential fluctuation and the environmental fluctuation in repeated use in the high-temperature high-humidity environment had problems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-196774, filed Oct. 29, 2019 which is hereby incorporated by reference herein in its entirety.

What is claimed is:

1. An electrophotographic photosensitive member comprising a conductive supporting member, a photosensitive layer and a protective layer in this order,
   wherein the protective layer comprises a polymer of a composition comprising
   a hole transporting compound having two or more (meth)acryloyloxy groups and
   a compound represented by the following formula (1):

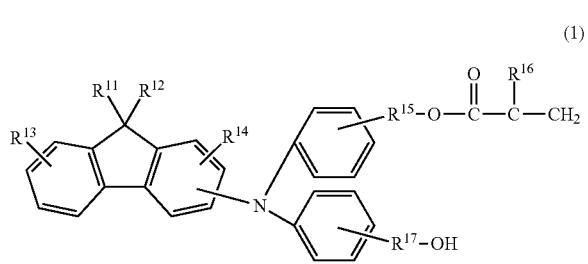

(1)

wherein R11 and R12 each independently represent an alkyl group having 1 or more and 8 or less carbon atoms; R13 and R14 each independently represent a hydrogen atom or an alkyl group having 4 or less carbon atoms; R15 and R17 each independently represent an alkylene group having 2 or more and 6 or less carbon atoms; and R16 represents a hydrogen atom or a methyl group.

2. The electrophotographic photosensitive member according to claim 1, wherein a content of the compound represented by the formula (1) in the composition is 1.0% by mass or lower based on a total mass of the composition.

3. The electrophotographic photosensitive member according to claim 1, wherein the hole transporting compound having two or more (meth)acryloyloxy groups is a compound represented by the following formula (2):

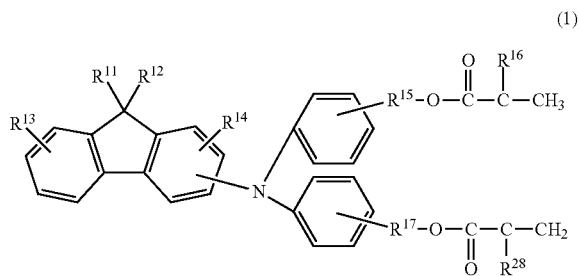

(1)

wherein R21 and R22 each independently represent an alkyl group having 2 or more and 8 or less carbon atoms; R23 and R24 each independently represent a hydrogen atom or an alkyl group having 4 or less carbon atoms; R25 and R27 each independently represent an alkylene group having 3 or more and 6 or less carbon atoms; and R26 and R28 each independently represent a hydrogen atom or a methyl group.

4. The electrophotographic photosensitive member according to claim 1, wherein the composition comprises a compound represented by the following formula (3):

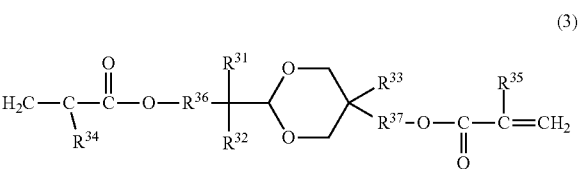

(3)

wherein R31 and R32 each independently represent an alkyl group having 1 or more and 4 or less carbon atoms, an aryl group having a substituent, or an unsubstituted aryl group; the substituent of the aryl group having a substituent is an alkyl group having 4 or less carbon atoms; R31 and R32 may be bound to each other to form a ring; R33 represents an alkyl group having 1 or more and 4 or less carbon atoms; R34 and R35 each independently represent a hydrogen atom or a methyl group; and R36 and R37 each independently represent an alkylene group having 1 or more and 4 or less carbon atoms.

5. The electrophotographic photosensitive member according to claim 4, wherein a content of the compound represented by the formula (3) in the composition is 5.0% by mass or higher and 50.0% by mass or lower based on a total mass of the composition.

6. The electrophotographic photosensitive member according to claim 1, wherein the composition comprises any of compounds represented by the following formulas (4) to (6):

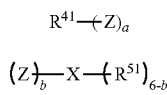
(4)

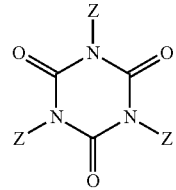
(5)

(6)

wherein in the formulas (4) to (6), Z represents a monovalent group represented by the following formula (7):

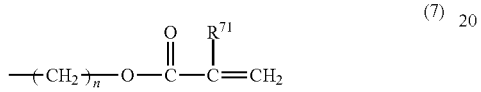
(7)

in the formula (7), n represents an integer of 0 to 6, and R71 represents a hydrogen atom or a methyl group;

in the formula (4), a represents an integer of 3 to 6, and R41 represents an a-valent group formed by removing a hydrogen atom from an alkane; and in the formula (5), b represents an integer of 3 to 6, R51 represents a hydroxy group or an alkyl group, and X represents a hexavalent group represented by the following formula (8):

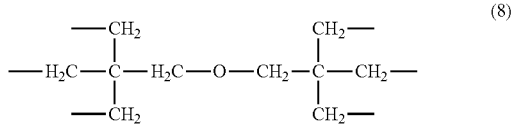
(8)

7. The electrophotographic photosensitive member according to claim 6, wherein a content of the compounds represented by the formulas (4) to (6) in the composition is 5.0% by mass or higher and 50.0% by mass or lower based on a total mass of the composition.

8. The electrophotographic photosensitive member according to claim 4, wherein at least one of R31 and R32 in the compound represented by the formula (3) is an alkyl group having 2 or more carbon atoms.

9. A process cartridge integrally supporting an electrophotographic photosensitive member and at least one unit selected from the group consisting of a charging unit, a developing unit and a cleaning unit, and being detachably attachable to a main body of an electrophotographic apparatus, wherein the electrophotographic photosensitive member comprises a conductive supporting member, a photosensitive layer and a protective layer in this order, and the protective layer comprises a polymer of a composition comprising a hole transporting compound having two or more (meth)acryloyloxy groups and a compound represented by the following formula (1):

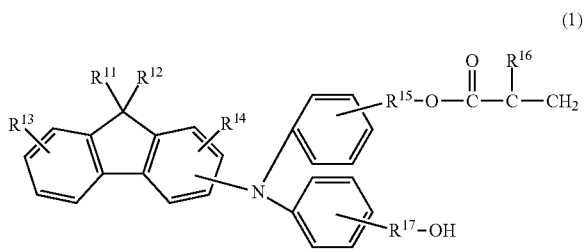
(1)

wherein R11 and R12 each independently represent an alkyl group having 1 or more and 8 or less carbon atoms; R13 and R14 each independently represent a hydrogen atom or an alkyl group having 4 or less carbon atoms; R15 and R17 each independently represent an alkylene group having 2 or more and 6 or less carbon atoms; and R16 represents a hydrogen atom or a methyl group.

10. An electrophotographic image forming apparatus comprising an electrophotographic photosensitive member and at least one unit selected from the group consisting of a charging unit, an exposure unit, a developing unit and a transfer unit, wherein the electrophotographic photosensitive member comprises a conductive supporting member, a photosensitive layer and a protective layer in this order; and the protective layer comprises a polymer of a composition comprising a hole transporting compound having two or more (meth)acryloyloxy groups and a compound represented by the following formula (1):

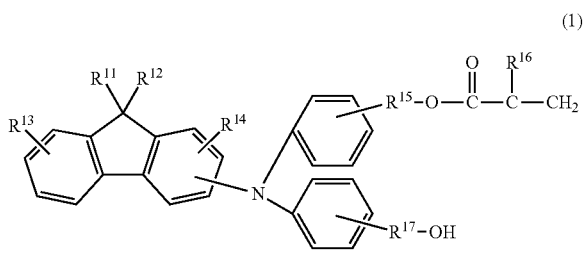
(1)

wherein R11 and R12 each independently represent an alkyl group having 1 or more and 8 or less carbon atoms; R13 and R14 each independently represent a hydrogen atom or an alkyl group having 4 or less carbon atoms; R15 and R17 each independently represent an alkylene group having 2 or more and 6 or less carbon atoms; and R16 represents a hydrogen atom or a methyl group.

* * * * *